United States Patent
Goto et al.

(10) Patent No.: US 12,422,340 B2
(45) Date of Patent: Sep. 23, 2025

(54) DYNAMOELECTRIC MACHINE EXAMINATION DEVICE, DYNAMOELECTRIC MACHINE EXAMINATION SYSTEM, AND DYNAMOELECTRIC MACHINE

(71) Applicant: MITSUBISHI GENERATOR CO., LTD., Kobe (JP)

(72) Inventors: Daichi Goto, Tokyo (JP); Naotaka Tsujimura, Tokyo (JP); Yoshihiro Morimoto, Tokyo (JP); Yasuki Hattori, Tokyo (JP)

(73) Assignee: MITSUBISHI GENERATOR CO., LTD., Kobe (JP)

( * ) Notice: Subject to any disclaimer, the term of this patent is extended or adjusted under 35 U.S.C. 154(b) by 257 days.

(21) Appl. No.: 18/256,646

(22) PCT Filed: Jan. 26, 2021

(86) PCT No.: PCT/JP2021/002524
§ 371 (c)(1),
(2) Date: Jun. 9, 2023

(87) PCT Pub. No.: WO2022/162715
PCT Pub. Date: Aug. 4, 2022

(65) Prior Publication Data
US 2024/0044748 A1   Feb. 8, 2024

(51) Int. Cl.
*G01M 99/00* (2011.01)
(52) U.S. Cl.
CPC .................. *G01M 99/005* (2013.01)
(58) Field of Classification Search
None
See application file for complete search history.

(56) References Cited

U.S. PATENT DOCUMENTS 5,105,658 A * 4/1992 Jaafar .................. G01R 31/34
                                                    73/865.8
5,365,166 A * 11/1994 Dailey .................. F16L 55/26
                                                    324/545
(Continued)

FOREIGN PATENT DOCUMENTS

CN     109980861 A    7/2019
EP     0684483 A2    11/1995
(Continued)

OTHER PUBLICATIONS

International Search Report (PCT/ISA/210) with translation and Written Opinion (PCT/ISA/237) mailed on Mar. 23, 2021 by the Japanese Patent Office as the International Searching Authority for International Application No. PCT/JP2021/002524. (11 pages).

(Continued)

*Primary Examiner* — Stephanie E Bloss
*Assistant Examiner* — Diana Hancock
(74) *Attorney, Agent, or Firm* — BUCHANAN, INGERSOLL & ROONEY PC

(57) ABSTRACT

A rotary electric machine examination device of the present disclosure includes: first and second base units attached to both ends of rotor retaining rings fixed to both axial end sides of a rotor; a guide wire stretched between the first and second base units; an inspection unit which moves on the stator and includes a housing having both side surfaces restricted by the guide wire, and a sensor unit; and a driving rope which drives the inspection unit in the axial direction. The guide wire is stretched such that the distance between the guide wire and the rotation axis at the positions of the first and second base units is greater than the distance between the guide wire and the rotation axis at the position of the inspection unit.

15 Claims, 18 Drawing Sheets

(56) References Cited

U.S. PATENT DOCUMENTS

| | | | | |
|---|---|---|---|---|
| 5,563,357 A * | 10/1996 | Longree | ............... | G01D 21/00 |
| | | | | 73/866.5 |
| 5,635,780 A * | 6/1997 | Kohlert | ............... | H02K 15/00 |
| | | | | 310/66 |
| 7,520,189 B2 * | 4/2009 | Abbasi | ............... | H02K 15/00 |
| | | | | 348/82 |
| 8,378,691 B2 * | 2/2013 | Moser | ............... | H02K 15/00 |
| | | | | 324/545 |
| 10,274,541 B2 * | 4/2019 | Fischer | ............. | G01R 31/1263 |
| 10,488,350 B2 * | 11/2019 | Lakhani | ............... | G06T 7/0004 |
| 2002/0135383 A1 | 9/2002 | Haeusermann et al. | | |
| 2008/0098832 A1 | 5/2008 | Abbasi et al. | | |
| 2013/0234752 A1 * | 9/2013 | Jaszcar | ............... | H02K 15/02 |
| | | | | 324/765.01 |
| 2016/0131595 A1 | 5/2016 | Miasnikov et al. | | |

FOREIGN PATENT DOCUMENTS

| | | |
|---|---|---|
| EP | 1233278 A2 | 8/2002 |
| JP | H02269438 A | 11/1990 |
| JP | H03261351 A | 11/1991 |
| JP | 2002209363 A | 7/2002 |
| JP | 2002262522 A | 9/2002 |
| JP | 2018118733 A | 8/2018 |

OTHER PUBLICATIONS

Notice of Reasons for Refusal with translation dated Aug. 31, 2021 issued by the Japanese Patent Office in corresponding Japanese Patent Application No. 2021-529383. (6 pages).

Extended European Search Report dated Feb. 16, 2024, issued in the corresponding European Patent Application No. 21922740.2, 18 pages.

* cited by examiner

DYNAMOELECTRIC MACHINE EXAMINATION DEVICE, DYNAMOELECTRIC MACHINE EXAMINATION SYSTEM, AND DYNAMOELECTRIC MACHINE

TECHNICAL FIELD

The present disclosure relates to a rotary electric machine examination device, a rotary electric machine examination system, and a rotary electric machine examination method.

BACKGROUND ART

Conventionally, work for inspecting a rotary electric machine has been performed by pulling out a rotor from a stator. Work for pulling out the rotor requires the rotary electric machine to be stopped for a long period, and the cost for performing the inspection work is high. Further, there is a risk that the stator or the rotor is damaged during the inspection work.

As a measure for such inspection work that can cause the above problem, proposed is a method of inspecting the rotary electric machine in a state in which the rotor is not pulled out from the stator of the rotary electric machine. For example, Patent Document 1 discloses an examination method in which base units are fixed to both end sides of a rotor of a rotary electric machine, a wire is stretched between the base units, and an examination unit is supported and moved via the wire, thereby inspecting the inside of the rotary electric machine without pulling out the rotor.

CITATION LIST

Patent Document

Patent Document 1: Specification of US Patent application publication No. 2002/0135383

SUMMARY OF THE INVENTION

Problems to be Solved by the Invention

The conventional examination unit is supported by only the wire stretched between the base units. Therefore, as the examination unit moves along the axial direction of the rotor away from each of the base units placed on both end sides of the rotor, the wire sags in the gravity direction by the self-weight of the wire or the examination unit. As a result, there is a problem that it is difficult to perform positioning of the examination unit in the radial direction or the circumferential direction of the rotor of the rotary electric machine.

The present disclosure has been made to solve the above problem, and an object of the present disclosure is to provide a rotary electric machine examination device, a rotary electric machine examination system, and a rotary electric machine examination method that enable improvement in positioning accuracy for an examination unit inserted into a gap space between a stator and a rotor of a rotary electric machine.

Solution to the Problems

A rotary electric machine examination device according to the present disclosure is a rotary electric machine examination device for examining a rotary electric machine having an annular stator and a rotor rotatably provided on an inner surface side of the stator, the rotary electric machine examination device including: a first base unit and a second base unit respectively attached to one and another of rotor retaining rings respectively fixed to both end sides in an axial direction of the rotor; a guide wire stretched between the first base unit and the second base unit; an inspection unit including a housing of which both side surfaces are restricted by the guide wire, and a sensor unit which is attached to the housing and measures the rotor, the inspection unit being movable in the axial direction on the stator; and a driving rope of which one end is attached to the housing and which drives the inspection unit along the axial direction. The guide wire is stretched such that a distance between the guide wire and a rotation axis of the rotor at positions of the first base unit and the second base unit is greater than a distance between the guide wire and the rotation axis of the rotor at a position of the inspection unit.

A rotary electric machine examination system according to the present disclosure includes: the above rotary electric machine examination device; and a remote device connected with the rotary electric machine examination device through communication.

A rotary electric machine examination method according to the present disclosure is a rotary electric machine examination method using a rotary electric machine examination system including the above rotary electric machine examination device and a remote device connected with the rotary electric machine examination device through communication, the method including the steps of: registering examination position information of the inspection unit inside the rotary electric machine; performing movement in a circumferential direction of the rotor in a state in which the inspection unit is mounted to the first base unit or the second base unit, on the basis of the examination position information; moving the inspection unit in the axial direction of the rotor by the driving rope on the basis of the examination position information; and the inspection unit performing inspection at each examination position by at least one inspection means on the basis of the examination position information.

Effect of the Invention

In the rotary electric machine examination device according to the present disclosure, the guide wire is stretched such that the distance between the guide wire and the rotation axis of the rotor at the positions of the first base unit and the second base unit is greater than the distance between the guide wire and the rotation axis of the rotor at the position of the inspection unit, thus providing an effect that positioning accuracy for the inspection unit inserted into the gap space between the stator and the rotor can be improved.

In the rotary electric machine examination system according to the present disclosure, the guide wire is stretched such that the distance between the guide wire and the rotation axis of the rotor at the position of the first base unit or the second base unit is greater than the distance between the guide wire and the rotation axis of the rotor at the position of the inspection unit, thus providing an effect that positioning accuracy for the inspection unit inserted into the gap space between the stator and the rotor can be improved.

In the rotary electric machine examination method according to the present disclosure, the rotary electric machine examination device having high positioning accuracy for the inspection unit is used, whereby inspection work in the rotary electric machine can be automatically per-

DESCRIPTION OF EMBODIMENTS

Figure 1:
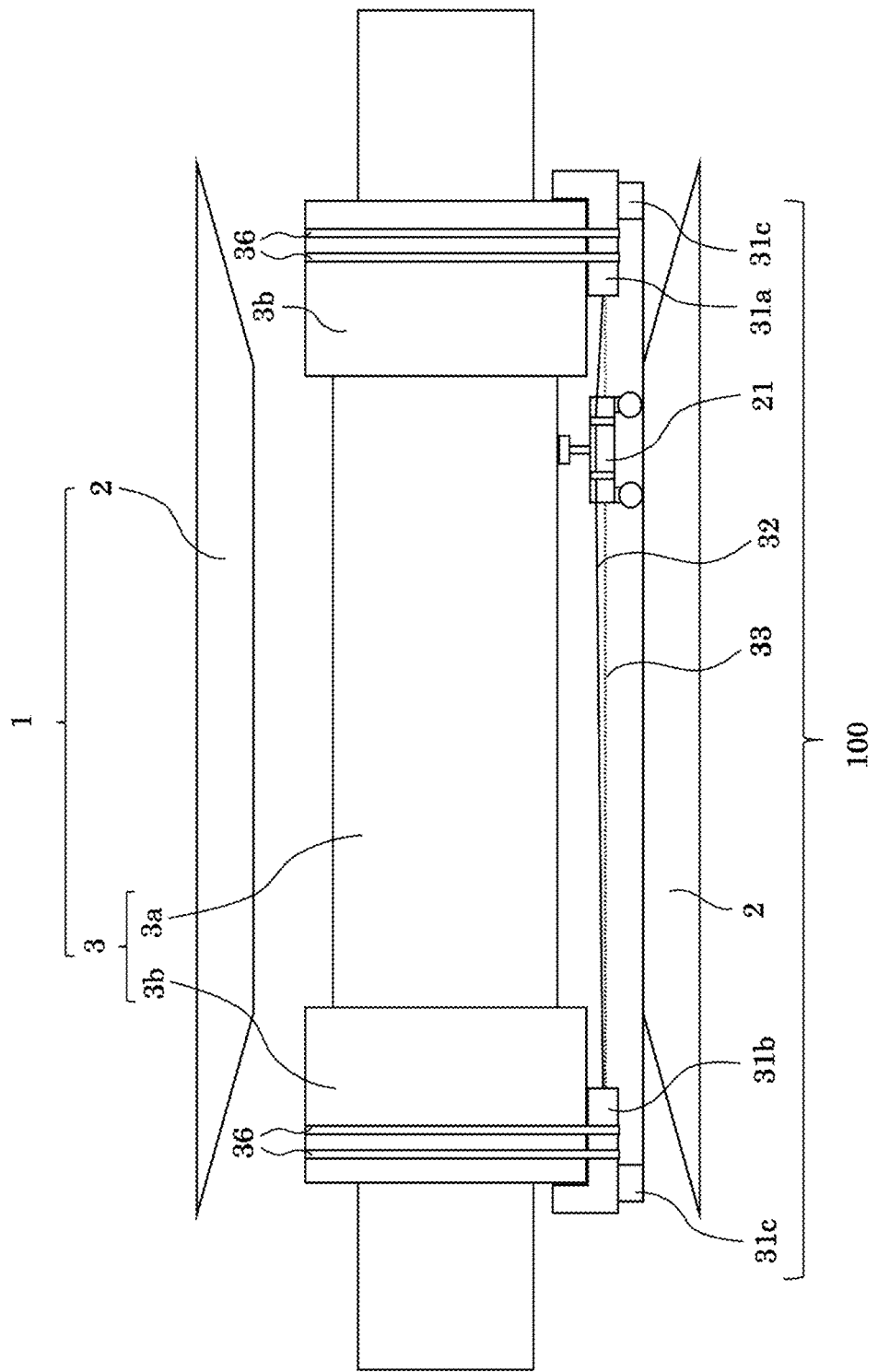
FIG. 1 is a schematic structure view of a rotary electric machine examination device according to embodiment 1.

Hereinafter, a rotary electric machine examination device, a rotary electric machine examination system, and a rotary electric machine examination method according to embodiments of the present disclosure will be described with reference to the drawings. In the drawings, the same or corresponding members and parts are denoted by the same reference characters, to give description.

Embodiment 1

FIG. 1 is a schematic structure view of a rotary electric machine examination device 100 according to embodiment 1. A rotary electric machine 1 is mainly composed of an annular stator 2 and a rotor 3 which is provided on the inner surface side of the annular stator 2 and rotates about the axial direction, i.e., rotates about the rotation axis. The rotor 3 is composed of a rotor shaft 3a and rotor retaining rings 3b fixed to both end sides of the rotor shaft 3a. The diameter of the rotor retaining rings 3b is greater than the diameter of the rotor shaft 3a. Therefore, in a case where the rotary electric machine examination device 100 is inserted to the inside of the rotary electric machine 1, i.e., into a space formed by a gap between the stator 2 and the rotor 3, a gap at the entrance of the rotary electric machine 1, i.e., a gap space formed by the rotor retaining ring 3b and the stator 2, is narrowest.

The rotary electric machine examination device 100 includes: an inspection unit 21 which moves on the stator 2 along the axial direction of the rotor 3; a first base unit 31a and a second base unit 31b which are respectively attached to the rotor retaining rings 3b; an insertion rail 31c attached to at least one of the first base unit 31a and the second base unit 31b; a guide wire 32 stretched between the first base unit 31a and the second base unit 31b; a driving rope 33 attached for driving the inspection unit 21; and winding mechanisms 36 for fixing the first base unit 31a and the second base unit 31b to the rotor retaining rings 3b and moving the inspection unit 21 in the circumferential direction of the rotor 3. The guide wire 32 serves to restrict the inspection unit 21 from moving in the radial direction and the circumferential direction of the rotor 3. It is desirable that sag of the guide wire 32 is as little as possible.

Figure 2:
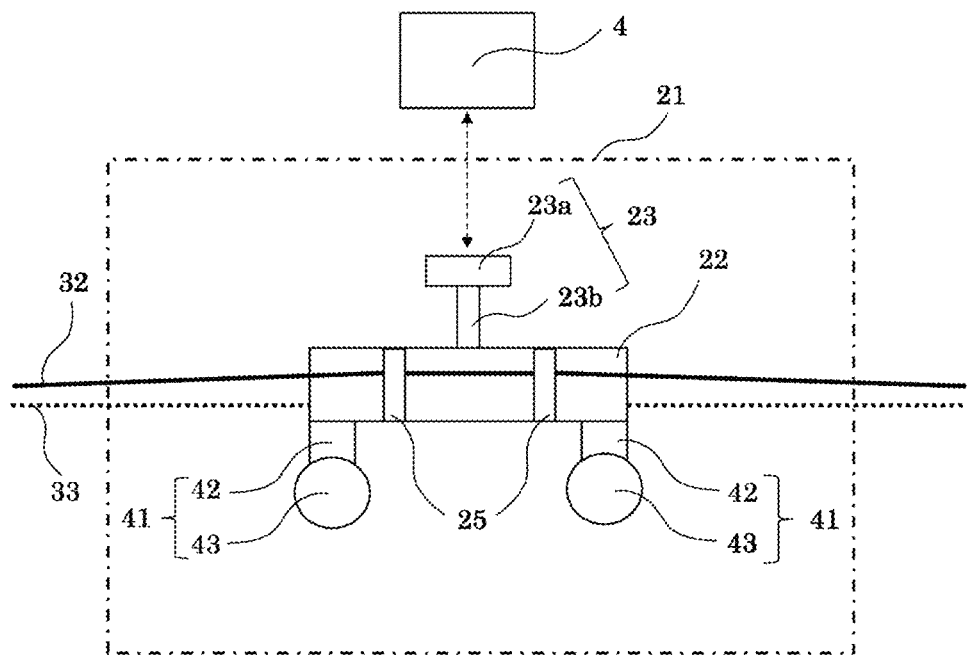
FIG. 2 is a schematic structure view of an inspection unit of the rotary electric machine examination device according to embodiment 1 in a state in which a guide wire and a driving rope are combined, as seen from the lateral direction.

FIG. 2 is a schematic structure view of the rotary electric machine examination device 100 according to embodiment 1 in a state in which the inspection unit 21, the guide wire 32, and the driving rope 33 are combined, as seen from the lateral direction. The lateral direction refers to a direction in which the rotary electric machine examination device 100 is seen from a side of the cross-section along the axial direction.

Figure 3:
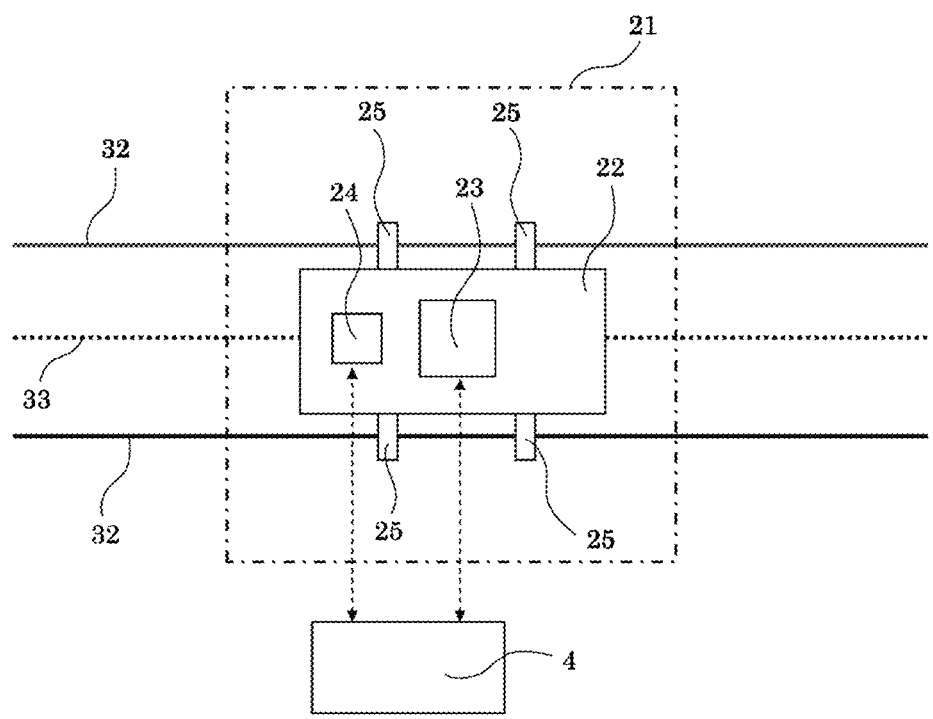
FIG. 3 is a schematic structure view of the inspection unit of the rotary electric machine examination device according to embodiment 1 in a state in which the guide wire and the driving rope are combined, as seen from a rotor side.

FIG. 3 is a schematic structure view of the inspection unit 21 of the rotary electric machine examination device 100 according to embodiment 1 in a state in which the guide wire 32 and the driving rope 33 are combined, as seen from the rotor 3 side. The inspection unit 21 is composed of a case 22 (housing), a sensor unit 23, a sensor unit 24, guides 25, and arms 41.

The sensor unit 23 is composed of, for example, a contact-type sensor 23a (inspection means) and a sensor elevating/lowering mechanism 23b for elevating/lowering the contact-type sensor 23a, as shown in FIG. 2. The sensor elevating/lowering mechanism 23b is provided on the case 22 of the inspection unit 21, on the surface side opposed to the rotor 3.

The inspection unit 21 passes the gap space between the rotor retaining ring 3b and the stator 2, and then, in response to a control signal transmitted from a control unit (not shown) provided inside a remote device 4 located outside the rotary electric machine 1, a command is issued from a control unit (not shown) stored inside the case 22 of the inspection unit 21, whereby the sensor elevating/lowering mechanism 23b extends toward the rotor shaft 3a side of the rotor 3, to bring the contact-type sensor 23a into contact with the rotor shaft 3a. Through contact between the contact-type sensor 23a and the rotor shaft 3a, measurement data such as the distance between the stator 2 and the rotor 3, more specifically, the distance between the stator 2 and the rotor shaft 3a, is acquired.

The remote device 4 is not a part composing the rotary electric machine examination device 100. However, the rotary electric machine examination device 100 and the remote device 4 form a rotary electric machine examination system described later.

Data such as the distance measured through contact between the contact-type sensor 23a and the rotor shaft 3a is transmitted to the remote device 4 by communication via the control unit inside the case 22 of the inspection unit 21. The sensor elevating/lowering mechanism 23b may be extended toward the stator 2 side to bring the contact-type sensor 23a into contact with the stator 2, whereby the stator 2 may be examined.

The sensor unit 24 may be configured with a sensor that is a measurement type different from the above contact-type sensor 23a. An example of a sensor (inspection means) that is a different measurement type is a noncontact-type sensor. A specific example of such a noncontact-type sensor is visual inspection using a camera.

As shown in FIG. 3, one inspection unit 21 may be provided with both of the sensor unit 23 and a sensor unit 24 that are different measurement types. This has an advantage that more accurate data can be obtained through measurement using the two types of sensor units independently.

The guides 25 serve to restrict the guide wire 32 and the inspection unit 21 from moving in a direction other than a direction along the guide wire 32, i.e., the axial direction of the rotor 3. That is, the guide wire 32 is connected to the guides 25 so as to restrict the inspection unit 21 from moving in the radial direction and the circumferential direction of the rotor 3.

As an example of a connection method for the guide wire 32, the guides 25 may be formed in a ring shape, and the guide wire 32 may be inserted through inner holes of the ring-shaped part of the guides 25, whereby the guides 25 and the guide wire 32 may be connected.

One end of the driving rope 33 is attached to the case 22 of the inspection unit 21. With tension imparted to the driving rope 33, the inspection unit 21 is moved in the direction along the guide wire 32, i.e., the axial direction of the rotor 3. Regarding the guide wire 32 and the driving rope 33, the entirety of the wire/rope may be formed by one wire/rope or a plurality of wires/ropes. In a case of forming the driving rope 33 by a plurality of ropes, the plurality of driving ropes 33 are operated in coordination while one side of the driving ropes stretched leftward and rightward in FIG. 2 and FIG. 3 is pulled and the other side is fed, for example.

The arms 41 are attached to both side surfaces of the case 22 of the inspection unit 21, and normally, four arms 41 are provided to the case 22. As shown in FIG. 2, each arm 41 is composed of an adjusted-length leg 42 and a wheel 43. The adjusted-length leg 42 has one end attached to the wheel 43 and another end attached to the case 22 of the inspection unit 21. The adjusted-length leg 42 allows adjustment in the length in the up-down direction in FIG. 1, i.e., the radial direction of the rotor 3 of the rotary electric machine 1. By replacing the adjusted-length leg 42 with one having a different length, the distance between the guide 25 and the stator 2 is adjusted. Each wheel 43 is a passive wheel and rolls on the stator 2.

The insertion rail 31c is provided in order that the inspection unit 21 traveling on the stator 2 having taper shapes at both ends can keep a constant distance from the rotor 3 even at both ends of the stator 2.

Figure 4:
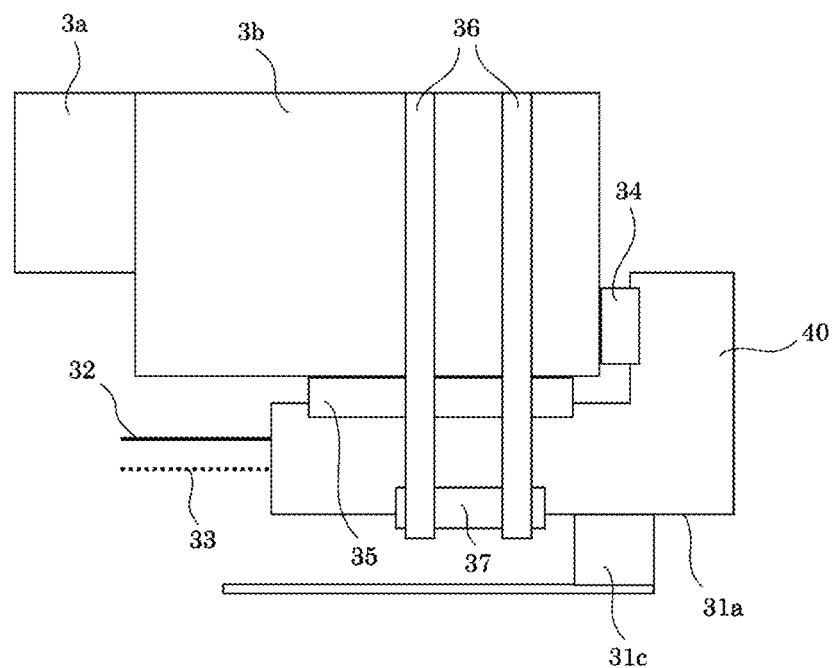
FIG. 4 is a schematic structure view of the rotary electric machine examination device according to embodiment 1 in a state in which a base unit is attached to the rotor, as seen from the lateral direction.

FIG. 4 is a schematic structure view of the rotary electric machine examination device 100 according to embodiment 1 in a state in which the first base unit 31a is attached to the rotor 3 via the rotor retaining ring 3b, as seen from the lateral direction. The second base unit 31b is also attached to the rotor 3 via the rotor retaining ring 3b, in the same manner.

Figure 5:
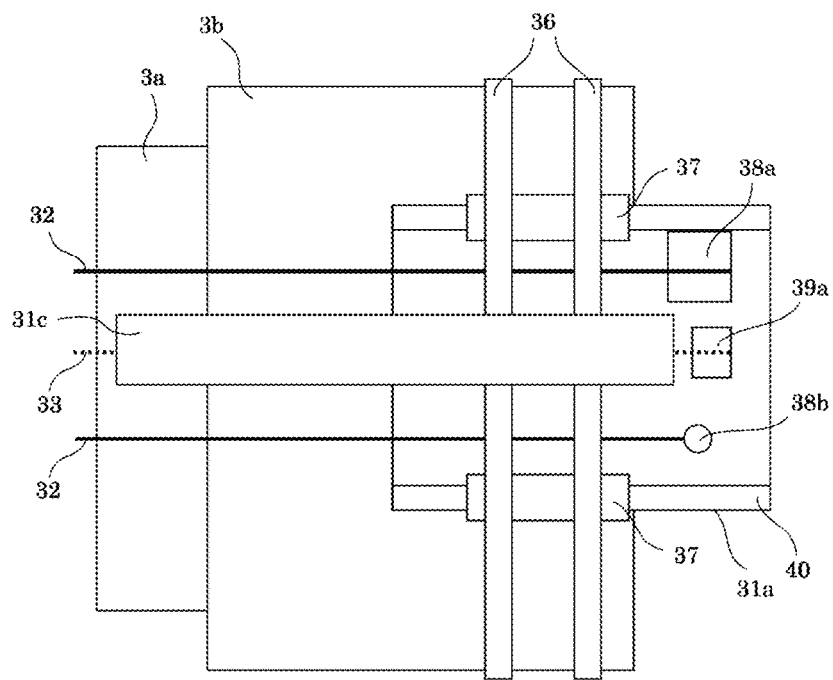
FIG. 5 is a schematic structure view of the rotary electric machine examination device according to embodiment 1 in a state in which the base unit is attached to the rotor, as seen from a stator side.
Figure 6:
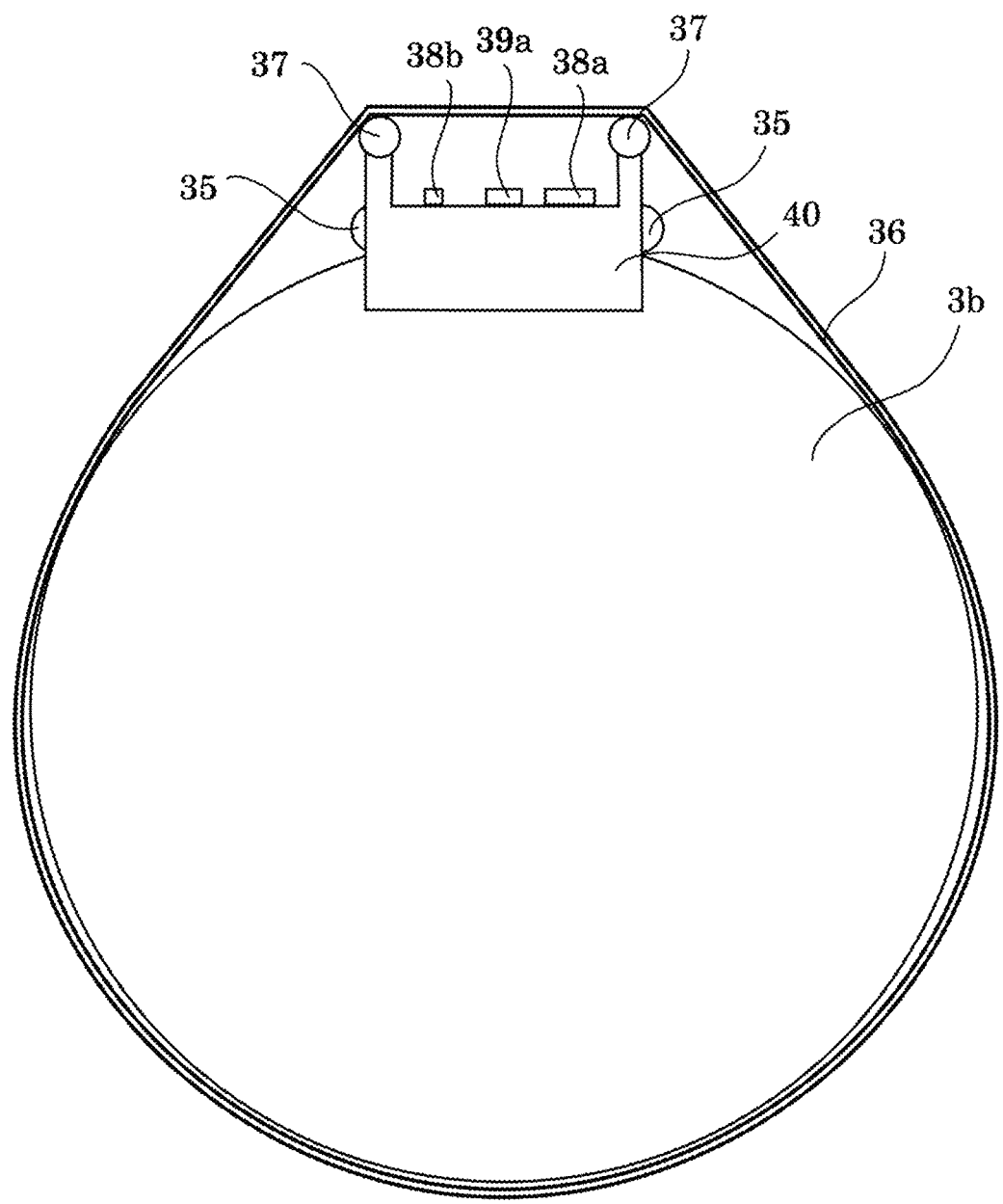
FIG. 6 is a schematic structure view of the rotary electric machine examination device according to embodiment 1 in a state in which the base unit is attached to the rotor, as seen from the axial direction.

FIG. 5 is a schematic structure view of the rotary electric machine examination device 100 according to embodiment 1 in a state in which the first base unit 31a is attached to the rotor 3 via the rotor retaining ring 3b, as seen from the stator 2 side. FIG. 6 is a schematic structure view of the rotary electric machine examination device 100 according to embodiment 1 in a state in which the first base unit 31a is attached to the rotor 3 via the rotor retaining ring 3b, as seen from the axial direction of the rotor 3. In FIG. 6, the stator 2 is not shown, for facilitating visual understanding.

As shown in FIG. 4 and FIG. 5, the first base unit 31a is composed of the insertion rail 31c, a first guide wheel 34, a second guide wheel 35, the winding mechanism 36, a guide roller 37, a tension imparting unit 38a, a guide wire support shaft 38b, a rope driving unit 39a, and a station 40. The second base unit 31b is also configured in the same manner as the first base unit 31a.

The station 40 is tightened and fixed to the rotor retaining ring 3b by the winding mechanism 36. As the first guide wheel 34, the second guide wheel 35, and the guide roller 37 rotate, the inspection unit 21 moves along the circumferential direction of the rotor retaining ring 3b. In order to allow stop at all orientation positions in the circumferential direction around the rotor retaining ring 3b, a brake mechanism (not shown) for stopping rotation of the first guide wheel 34, the second guide wheel 35, and the guide roller 37 or movement of the station 40 is provided at least at one location, e.g., at the first guide wheel 34, the second guide wheel 35, at the guide roller 37, or directly to the rotor retaining ring 3b.

An example of the winding mechanism 36 is a chain. In a case where the winding mechanism 36 is a chain, a sprocket is applied to the guide roller 37. In addition, for example, a rotary drive source (not shown) such as an electric motor may be directly or indirectly connected to at least one of the first guide wheel 34, the second guide wheel 35, or the guide roller 37, whereby movement of the station 40 in the circumferential direction of the rotor 3 can be controlled by another control device.

The guide wire 32 is imparted with tension by the tension imparting unit 38a and the guide wire support shaft 38b. The tension imparting unit 38a constantly maintains tension during inspection work by the inspection unit 21. An example of the tension imparting unit 38a is a winch having a brake mechanism.

Figure 7A:
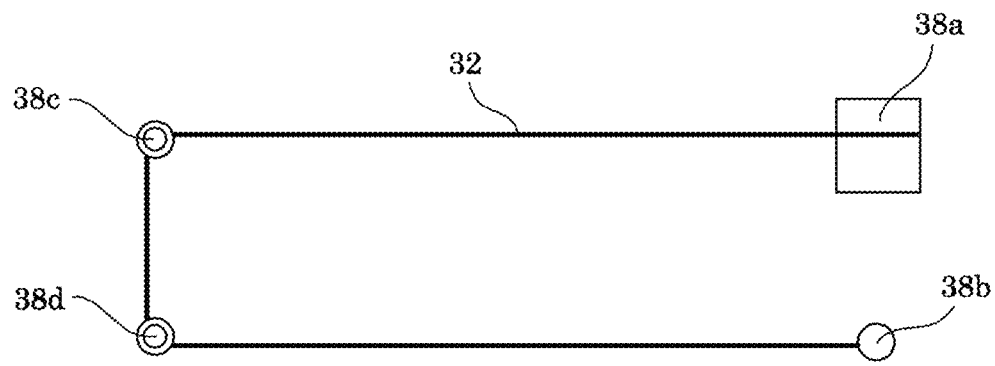
FIGS. 7A-7C illustrate structure examples for fixing the guide wire in the rotary electric machine examination device according to embodiment 1.
Figure 7B:
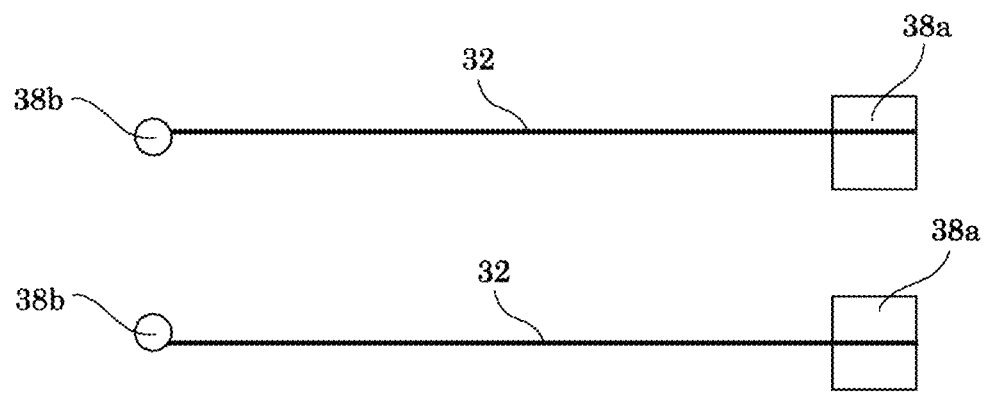
Figure 7C:
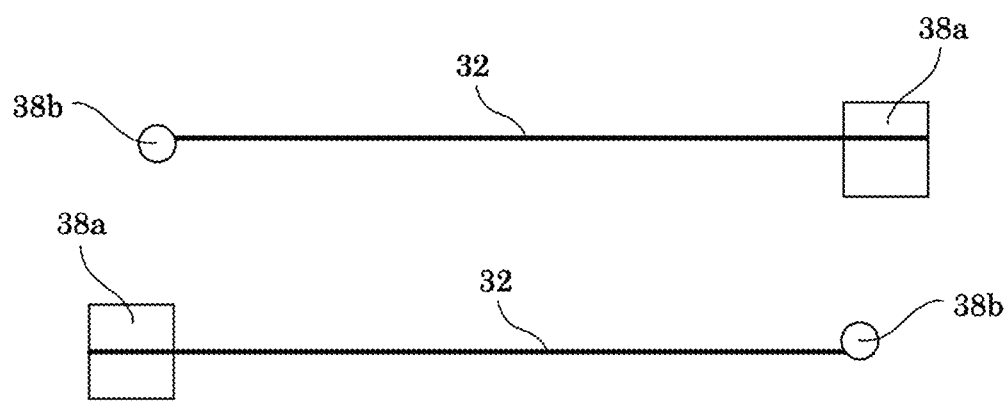

FIGS. 7A-7C illustrate structure examples for fixing the guide wire 32 in the rotary electric machine examination device 100 according to embodiment 1.

In the rotary electric machine examination device 100 according to embodiment 1, in a case of forming the guide wire 32 by one wire, for example, if the tension imparting unit 38a and the guide wire support shaft 38b are provided to the first base unit 31a, the second base unit 31b provided as another one of the pair of base units 31 is provided with a first guide wire roller 38c and a second guide wire roller 38d for turning back the guide wire 32 (FIG. 7A).

In the rotary electric machine examination device 100 according to embodiment 1, in a case of forming the guide wire 32 by one wire, two tension imparting units 38a may be provided to either the first base unit 31a or the second base unit 31b (FIG. 7B).

One tension imparting unit 38a and one guide wire support shaft 38b may be provided to each of both the first base unit 31a and the second base unit 31b (FIG. 7C).

The first base unit 31a and the second base unit 31b may be switched with each other. Instead of the two first and second guide wire rollers 38c and 38d, one guide wire roller may be provided.

Figure 8A:
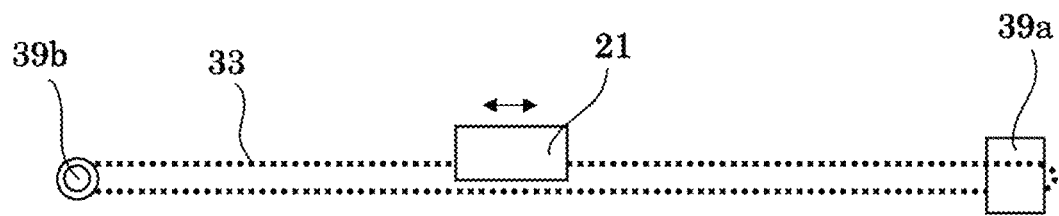
FIGS. 8A-8B illustrate structure examples of the driving rope in the rotary electric machine examination device according to embodiment 1.
Figure 8B:
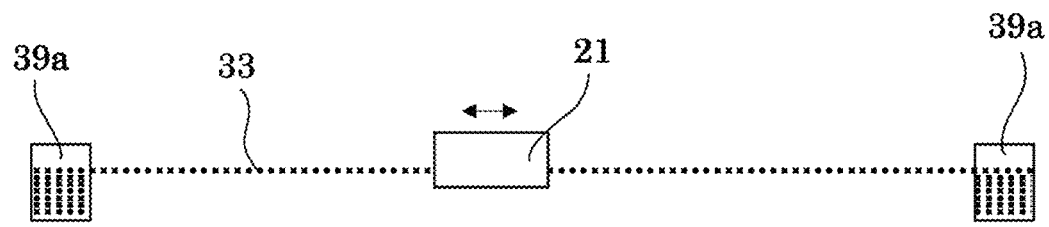

FIGS. 8A-8B illustrate structure examples of the driving rope 33 of the rotary electric machine examination device according to embodiment 1.

The driving rope 33 is driven by the rope driving unit 39a. In the rotary electric machine examination device 100 according to embodiment 1, in a case of forming the driving rope 33 by one rope, for example, if the rope driving unit 39a is provided to the first base unit 31a, the second base unit 31b provided as another one of the pair of base units 31 is provided with a driving rope roller 39b for turning back the driving rope 33 (FIG. 8A). In this case, the rope driving unit 39a needs to drive the driving rope 33 bi-directionally, and is formed by an electric motor (not shown) and a pulley (not shown), for example.

In the rotary electric machine examination device 100 according to embodiment 1, in a case of forming the driving rope 33 by two ropes, for example, the rope driving units 39a may be provided to both the first base unit 31a and the second base unit 31b (FIG. 8B).

In this case, the respective rope driving units 39a operate in coordination so that the driving rope 33 can be reeled and fed. For example, the rope driving unit 39a is formed by an electric motor (not shown) and a drum (not shown). In such a structure, the feeding operation may be active or passive, and it suffices that the driving rope 33 can be fed along with the reeling operation of the other rope driving unit 39a.

Next, a setting condition of the guide wire 32 will be described with reference to FIG. 9.

Figure 9:
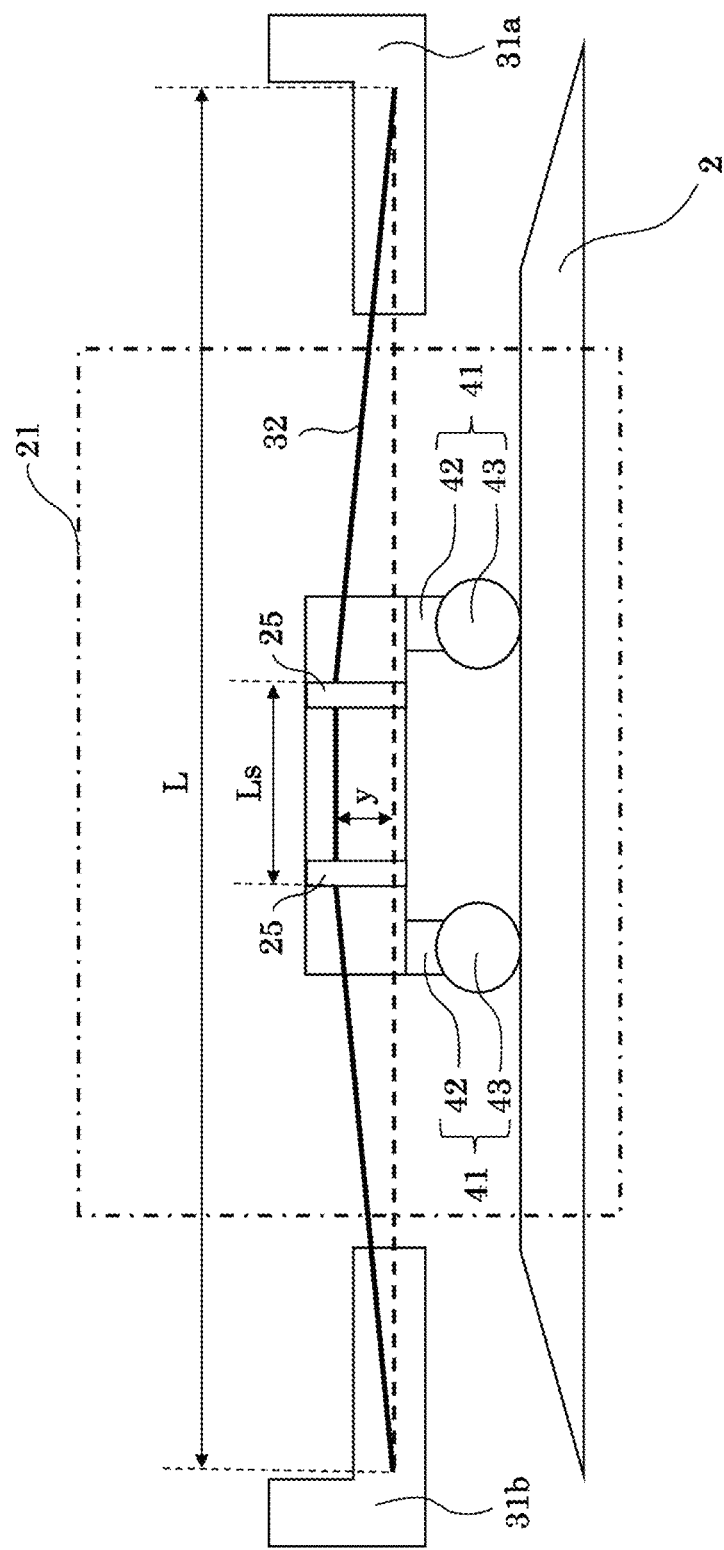
FIG. 9 is a schematic structure view showing the guide wire, the base units for stretching the guide wire, and the inspection unit in the rotary electric machine examination device according to embodiment 1.

FIG. 9 is a schematic structure view showing the guide wire 32, the first base unit 31a and the second base unit 31b for stretching the guide wire 32, and the inspection unit 21. In FIG. 9, the insertion rail 31c is not shown.

The guide wire 32 is stretched such that the distance between the guide wire 32 and the center of the rotor 3, i.e., the rotation axis thereof, at the position of the tension imparting unit 38a (not shown) or the guide wire support shaft 38b (not shown) attached to one or both of the first base unit 31a and the second base unit 31b, is greater than the distance between the guide wire 32 and the center of the rotor 3, i.e., the rotation axis thereof, at the position of the guide 25 of the inspection unit 21. The center of the rotor 3 refers to the position of the rotation axis about which the rotor 3 rotates.

That is, the guide wire 32 is stretched such that the distance between the guide wire 32 and the rotation axis of the rotor 3 at the positions of the first base unit 31a and the second base unit 31b is greater than the distance between the guide wire 32 and the rotation axis of the rotor 3 at the position of the inspection unit 21.

For providing effects described later, it is preferable to stretch the guide wire 32 such that, at the position of the first base unit 31a or the second base unit 31b, the guide wire 32 is farthest from the rotation axis of the rotor 3, and at the position of the guide 25 of the inspection unit 21, the guide wire 32 is closest to the rotation axis of the rotor 3.

Specifically, the distance between the tension imparting unit 38a (not shown) and the guide wire support shaft 38b (not shown) is denoted by L, the distance between the two guides 25 on one side surface of the case 22 of the inspection unit 21 is denoted by Ls, displacement in the radial direction of the rotor 3 arising between: the guide wire position between the guides 25; and a virtual guide wire position of a straight line connecting the tension imparting unit 38a and the guide wire support shaft 38b, is denoted by y (a direction toward the rotor 3 is defined as positive direction), the weight of the inspection unit 21 and the guide wire 32 is denoted by M, the gravitational acceleration is denoted by g, and tension imparted to the guide wire 32 is denoted by T. Then, the lengths of the adjusted-length legs 42 of the arms 41, the height of and the tension imparted by the tension imparting unit 38a (not shown) provided to one or both of the first base unit 31a and the second base unit 31b, the height of the guide wire support shaft 38b (not shown), and the like are set so as to satisfy the following Expression (1).

[Mathematical 1]

$$y > \frac{Mg}{4\,T\,\sin\theta}\left(\theta = \tan^{-1}\left(\frac{2y}{2L-Ls}\right)\right) \quad (1)$$

By setting parameters so as to satisfy Expression (1), a force of the guide wire 32 to be restored into a straight line shape, i.e., a force of pressing the inspection unit 21 to the stator 2, surpasses the weight of the inspection unit 21 and the guide wire 32. Thus, irrespective of the position of the inspection unit 21 on the stator 2 from the first base unit 31a to the second base unit 31b, the inspection unit 21 is effectively prevented from lifting off the stator 2.

Owing to the above structure, the rotary electric machine examination device 100 according to embodiment 1 makes it possible to significantly suppress such trouble, shown as a problem in the conventional art, that the guide wire sags by the weight of the guide wire and the examination unit, and due to the sag of the guide wire, the distance between the inspection unit and the stator or between the inspection unit and the rotor varies depending on the position of the inspection unit on the stator.

Depending on the examination content of the rotary electric machine 1, position accuracy of the inspection unit 21 not only in the radial direction of the rotor 3 but also in the circumferential direction thereof may be important.

Displacement in the circumferential direction is most likely to occur in cases where the inspection unit 21 is at positions in 3 o'clock and 9 o'clock directions of the rotary electric machine 1. In these cases, it is necessary to suppress displacement in the circumferential direction by a frictional force of the wheels 43 pressed to the stator 2. Therefore, in a case where position accuracy in the circumferential direction of the inspection unit 21 is required, parameters are set so as to satisfy the following Expression (2), where the coefficient of friction of the wheel 43 is denoted by μ.

[Mathematical 2]

$$y > \frac{\mu Mg}{4\ T\ \sin\theta}\left(\theta = \tan^{-1}\left(\frac{2y}{2L-Ls}\right)\right) \quad (2)$$

Operation of the rotary electric machine examination device 100 will be described with reference to FIG. 1.

First, the first base unit 31a and the second base unit 31b are moved along the circumferential direction of the rotor 3, and then are tightened and fixed to the rotor retaining ring 3b by the winding mechanisms 36, whereby the first base unit 31a and the second base unit 31b are fixed at a circumferential-direction position where inspection is to be performed on the rotor 3.

Next, the driving rope 33 of which one end is attached to the case 22 of the inspection unit 21 is driven by the rope driving unit 39a, to move the inspection unit 21 in the axial direction of the rotor 3 with the arms 41 contacting with the stator 2 while movement of the inspection unit 21 in the circumferential direction and the radial direction is restricted by the guide wire 32. The movement amount of the inspection unit 21 is adjusted so that the inspection unit 21 is stopped at an axial-direction position where inspection is to be performed on the stator 2.

In a state in which the inspection unit 21 is stopped, examination of the rotor 3 is performed by the sensor unit 23, to acquire data such as the distance between the inspection unit 21 and the rotor 3. After necessary data has been acquired at each axial-direction position, the inspection unit 21 is brought close to or stored into either the first base unit 31a or the second base unit 31b, and then is moved to the next inspection position in the circumferential direction. A series of operations in which data acquisition at each axial-direction position is performed at each inspection position in the circumferential direction, are repeated, whereby inspection for the entire rotor 3 of the rotary electric machine 1 is completed.

As described above, in the rotary electric machine examination device 100 according to embodiment 1, the inspection unit 21 to be inserted into the gap space between the stator 2 and the rotor 3 of the rotary electric machine 1 is moved in the axial direction of the rotor 3 by the driving rope 33 extending from the first base unit 31a and the second base unit 31b respectively provided to the rotor retaining rings 3b attached on both end sides of the rotor 3, and movement of the inspection unit 21 in the radial direction and the circumferential direction of the rotor 3 is restricted by the guide wire 32. Therefore, it becomes unnecessary to provide a driving device for traveling, in the inspection unit 21, whereby the inspection unit 21 can be downsized, thus providing an effect that the application range about sizes of the rotary electric machine 1 is expanded.

In the rotary electric machine examination device 100 according to embodiment 1, the inspection unit 21 is supported so as to be pressed to the stator 2 by the guide wire 32. Therefore, occurrence of displacement in the non-control direction of the inspection unit 21, i.e., displacement of the inspection unit 21 in the radial direction and the circumferential direction of the rotor 3, is suppressed, thus providing an effect of favorably ensuring positioning accuracy for the inspection unit 21.

In the rotary electric machine examination device 100 according to embodiment 1, the guide wire 32 is stretched such that the distance between the guide wire 32 and the rotation axis at the position of the tension imparting unit 38a or the guide wire support shaft 38b attached to one or both of the first base unit 31a and the second base unit 31b is greater than the distance between the guide wire 32 and the rotation axis at the position of the guide 25 of the inspection unit 21. Therefore, occurrence of displacement of the inspection unit 21 in the radial direction and the circumferential direction of the rotor 3 is significantly suppressed, thus more remarkably providing an effect of favorably ensuring positioning accuracy for the inspection unit 21.

Modification 1 of Embodiment 1

Figure 10:
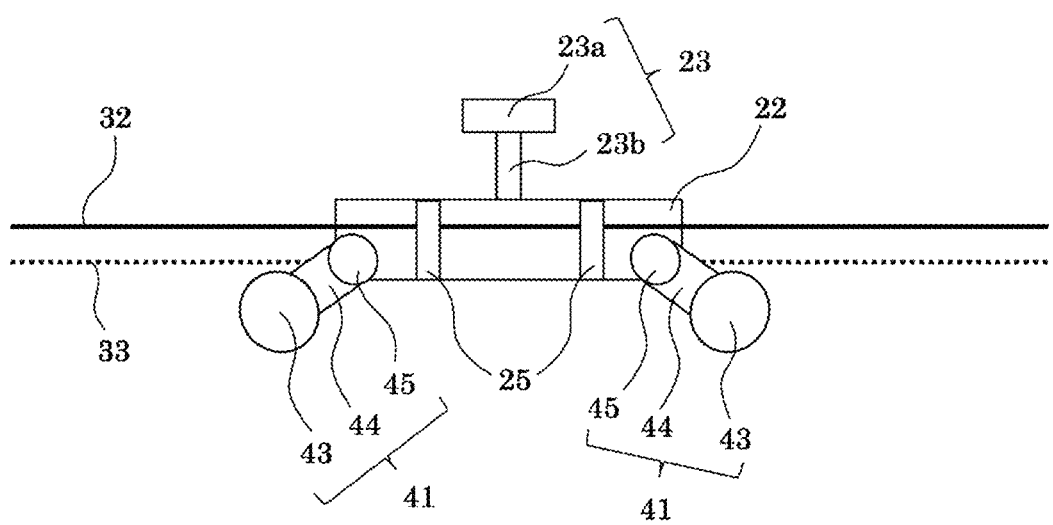
FIG. 10 is a schematic structure view of a rotary electric machine examination device according to modification 1 of embodiment 1 in a state in which an inspection unit, a guide wire, and a driving rope are combined, as seen from the lateral direction.

FIG. 10 is a schematic structure view of the rotary electric machine examination device 100 according to modification 1 of embodiment 1 in a state in which an inspection unit 21a, the guide wire 32, and the driving rope 33 are combined, as seen from the lateral direction. In FIG. 10, the following structure is different from that described above, but the other structures are the same as those of the rotary electric machine examination device 100 according to embodiment 1.

In FIG. 10, each arm 41 is composed of the wheel 43, a fixed-length leg 44, and an angle adjustment jig 45. By rotating the entire arm 41 about the angle adjustment jig 45, it is possible to adjust the length of the fixed-length leg 44 in the up-down direction in FIG. 10, i.e., the radial direction of the rotor 3. That is, using the angle adjustment jigs 45, the lengths of the fixed-length legs 44 in the radial direction are adjusted so that the guide wire 32 stretched between the first base unit 31a and the second base unit 31b does not sag, in accordance with the gaps between the stator 2 and the rotor retaining rings 3b.

In the rotary electric machine examination device 100 according to modification 1 of embodiment 1, an adjustment margin for the length of the fixed-length leg 44 can be ensured by one arm 41. Therefore, if the length in the radial direction of the fixed-length leg 44 is set so as to adapt to the rotary electric machine 1 that has the largest gap space between the rotor retaining ring 3b and the stator 2 for which inspection is assumed to be performed, it becomes possible to adjust the distance between the guide wire 32 and the stator 2 for a wide variety of rotary electric machines 1 by merely changing the angle of the angle adjustment jig 45.

FIGS. 11A-11D are schematic structure views showing the angle adjustment jig 45 of the arm 41 of the inspection unit 21a in the rotary electric machine examination device 100 according to modification 1 of embodiment 1.

Figure 11A:
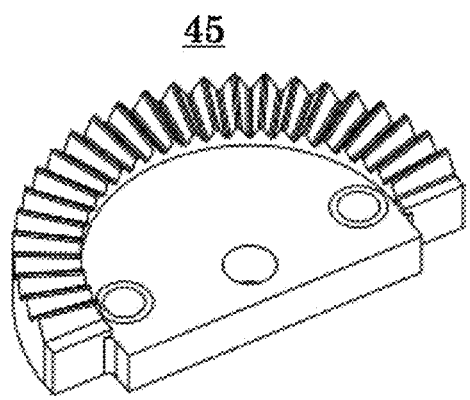
FIGS. 11A-11D are schematic structure views showing an angle adjustment jig of an arm of the inspection unit in the rotary electric machine examination device according to modification 1 of embodiment 1.
Figure 11B:
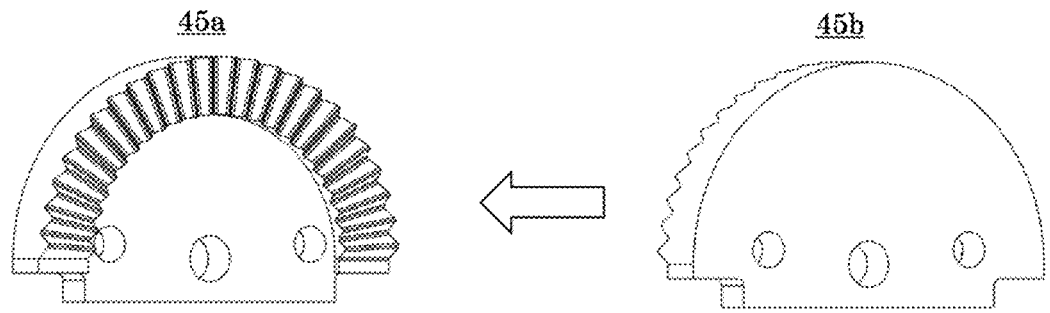
Figure 11C:
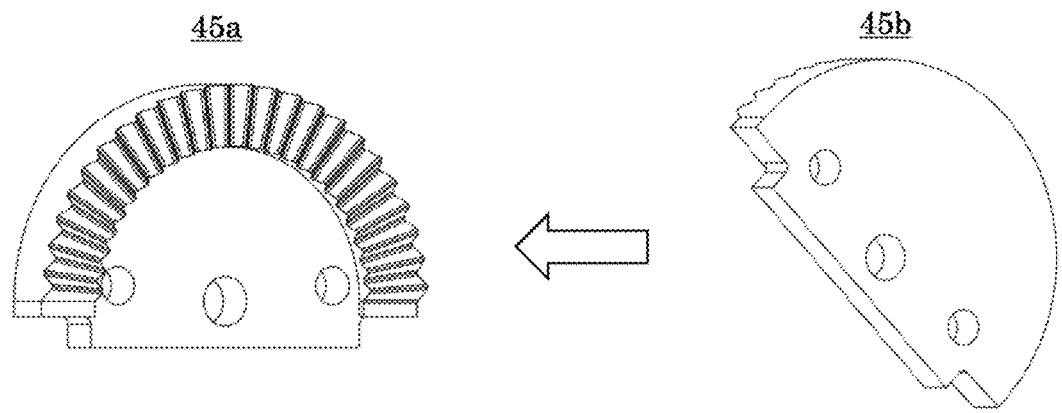

Using the angle adjustment jig 45 shown in FIG. 11A, for example, a pair of an angle adjustment jig 45a and an angle adjustment jig 45b are combined such that recesses and projections are formed on their contact surfaces. Thus, although in a stepwise manner, angle adjustment can be easily performed, and slip between the angle adjustment jigs 45 in fixation can be more suppressed (FIG. 11B and FIG. 11C).

Figure 11D:
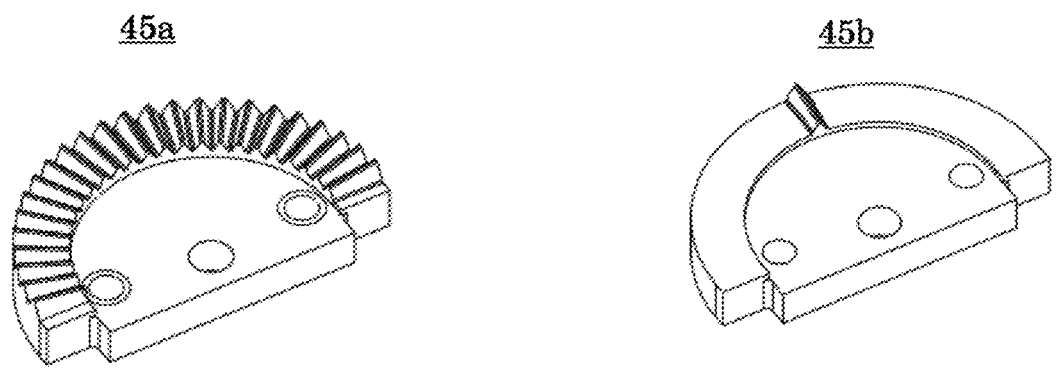

In this case, the recesses and projections may be formed at equal intervals on the angle adjustment jig 45a and the angle adjustment jig 45b, or the intervals of the recesses and projections may be adjusted in accordance with the dimensions of the rotary electric machine 1 that is an inspection target. The angle adjustment jig 45a and the angle adjustment jig 45b combined as a pair need not have the same shape, and may have different shapes while recesses and projections formed on the angle adjustment jig 45a and the angle adjustment jig 45b are allowed to fit to each other (FIG. 11D).

Modification 2 of Embodiment 1

Figure 12:
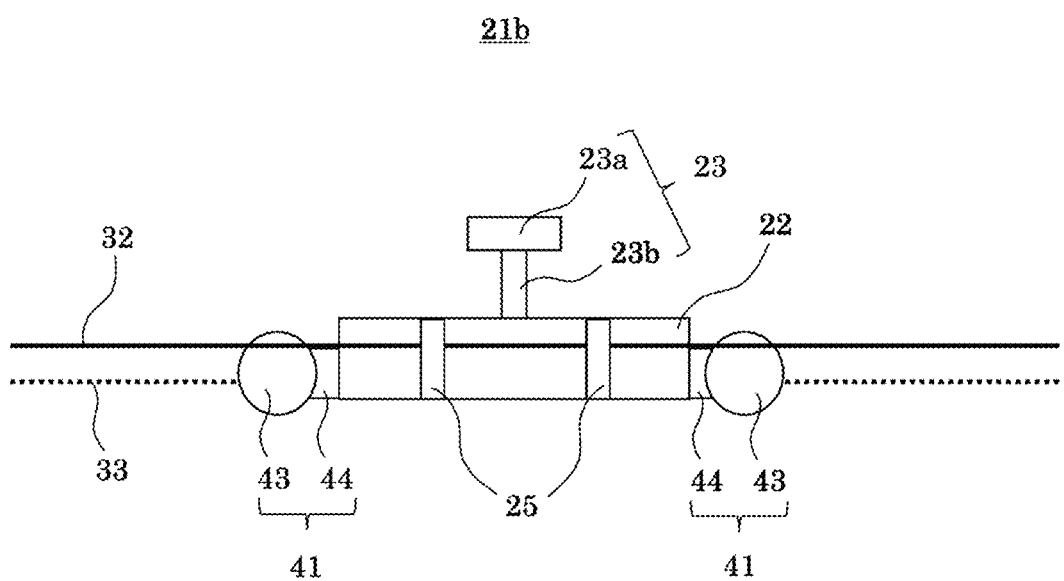
FIG. 12 is a schematic structure view of a rotary electric machine examination device according to modification 2 of embodiment 1 in which an inspection unit, a guide wire, and a driving rope are combined, as seen from the lateral direction.
Figure 13:
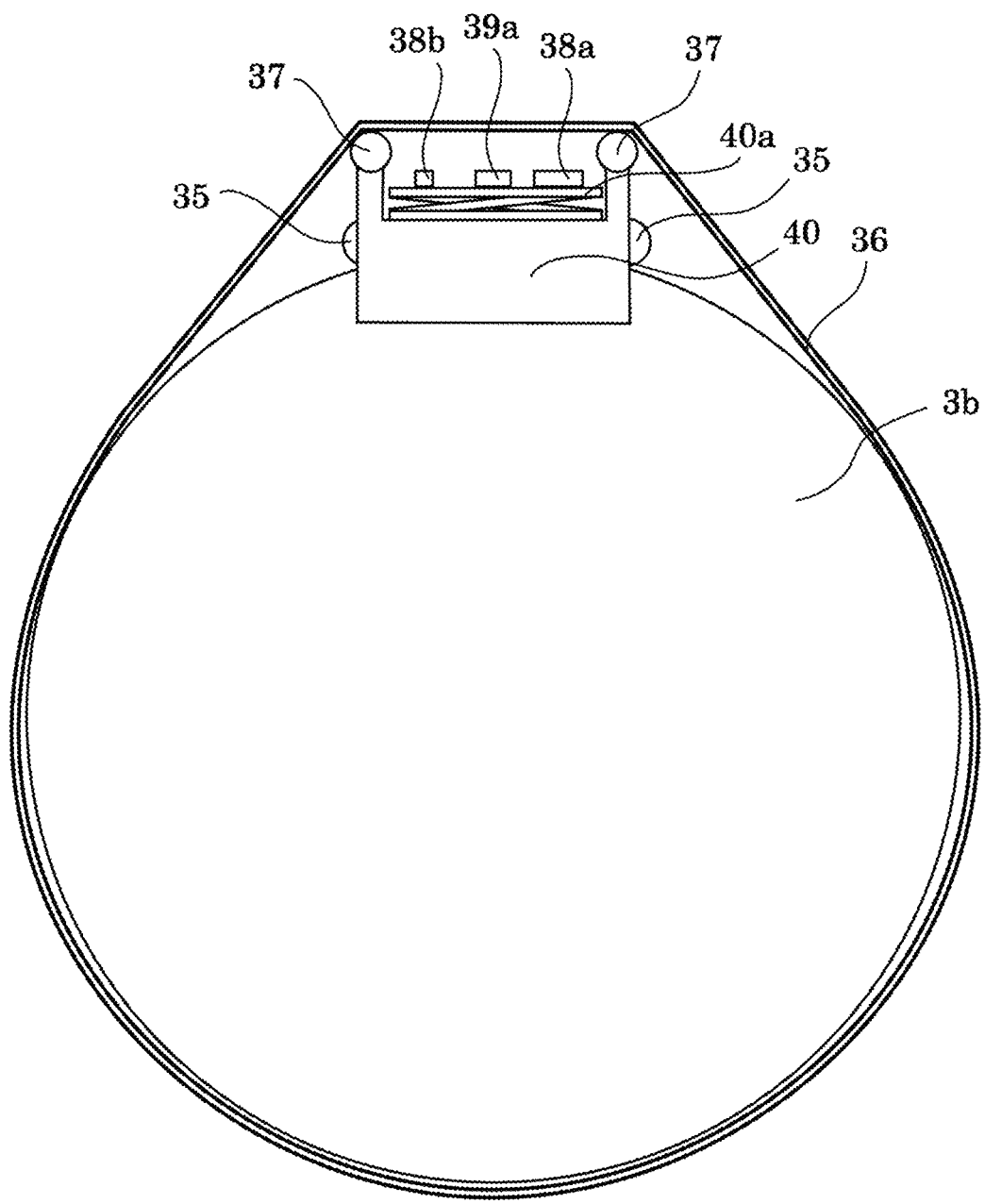
FIG. 13 is a schematic structure view of the rotary electric machine examination device according to modification 2 of embodiment 1 in a state in which a base unit is attached to a rotor, as seen from the axial direction of the rotor.

FIG. 12 is a schematic structure view of the rotary electric machine examination device 100 according to modification 2 of embodiment 1 in a state in which an inspection unit 21b, the guide wire 32, and the driving rope 33 are combined, as seen from the lateral direction. FIG. 13 is a schematic structure view of the rotary electric machine examination device 100 according to modification 2 of embodiment 1 in a state in which the base unit 31 is attached to the rotor 3, as seen from the axial direction of the rotor 3. In FIG. 12 and FIG. 13, the following structure is different from that described above, but the other structures are the same as those of the rotary electric machine examination device 100 according to embodiment 1.

In FIG. 12, each arm 41 is composed of the wheel 43 and the fixed-length leg 44. In FIG. 13, the tension imparting unit 38a, the guide wire support shaft 38b, and the rope driving unit 39a are connected to the station 40 of the base unit 31 via a base-unit-side elevating/lowering mechanism 40a, and the base-unit-side elevating/lowering mechanism 40a adjusts the positions in the radial direction of the tension imparting unit 38a and the guide wire support shaft 38b so as to satisfy the condition of the above Expression (1) or Expression (2).

In the rotary electric machine examination device 100 according to modification 2 of embodiment 1, the base-unit-side elevating/lowering mechanism 40a is provided so as to allow adjustment of the positions in the radial direction of the tension imparting unit 38a and the guide wire support shaft 38b. Therefore, for the inspection unit 21b, a radial-direction position adjustment mechanism adapted to the kind of the rotary electric machine 1 is not needed, so that the inspection unit 21b can be formed in a smaller and thinner size, thus providing an effect of expanding the application range to a rotary electric machine having a smaller size.

Modification 3 of Embodiment 1

Figure 14:
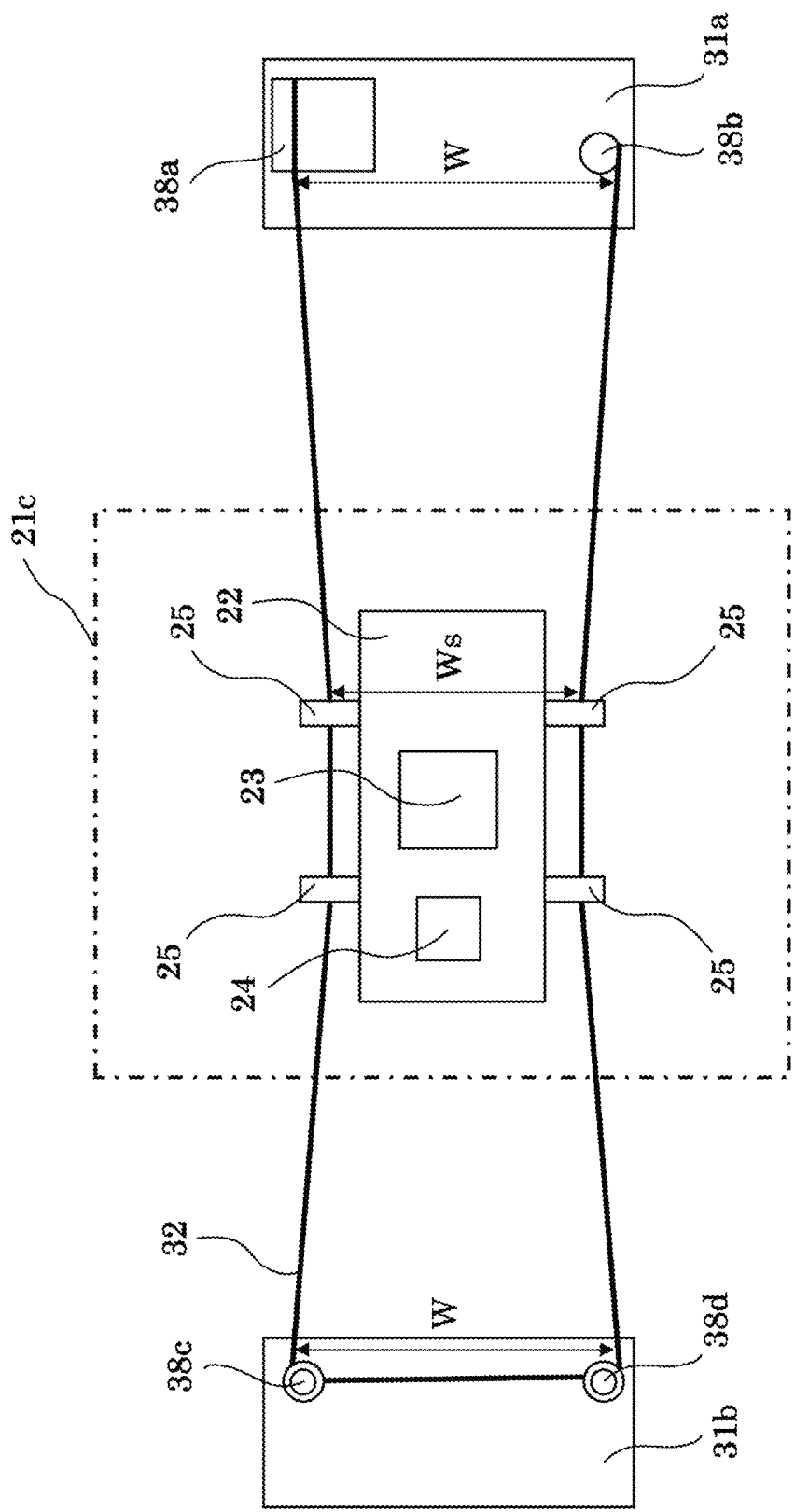
FIG. 14 is a schematic structure view of a rotary electric machine examination device according to modification 3 of embodiment 1 in a state in which an inspection unit and a guide wire are combined, as seen from the rotor side.

FIG. 14 is a schematic structure view of the rotary electric machine examination device 100 according to modification 3 of embodiment 1 in a state in which an inspection unit 21c and the guide wire 32 are combined, as seen from the rotor 3 side. In FIG. 14, the following structure is different from that described above, but the other structures are the same as those of the rotary electric machine examination device 100 according to embodiment 1.

In FIG. 14, a length W between the tension imparting unit 38a and the guide wire support shaft 38b for stretching the guide wire 32 or between the first guide wire roller 38c and the second guide wire roller 38d, is set to be greater than a length Ws between the guides 25 provided at both side surfaces of the inspection unit 21c.

As compared to the case where the two guide wires 32 restricting both side surfaces of the case 22 of the inspection unit 21 are stretched in parallel to each other as in the rotary electric machine examination device 100 according to embodiment 1 (W=Ws), in the rotary electric machine examination device 100 according to modification 3 of embodiment 1, a balanced state is made while forces in the circumferential direction of the rotor 3 are constantly applied from the guide wires 32 to both side surfaces of the case 22 of the inspection unit 21c, thus providing an effect of more restricting displacement in the circumferential direction when the inspection unit 21c is moved in the axial direction of the rotor 3. Such an effect is particularly significantly exhibited at the vertically upward or downward position of the rotary electric machine 1 where the state is free in the circumferential direction. The lengths W and Ws may not necessarily be set as W>Ws, and may be set as W<Ws, whereby the same effects are provided.

Modification 4 of Embodiment 1

Figure 15:
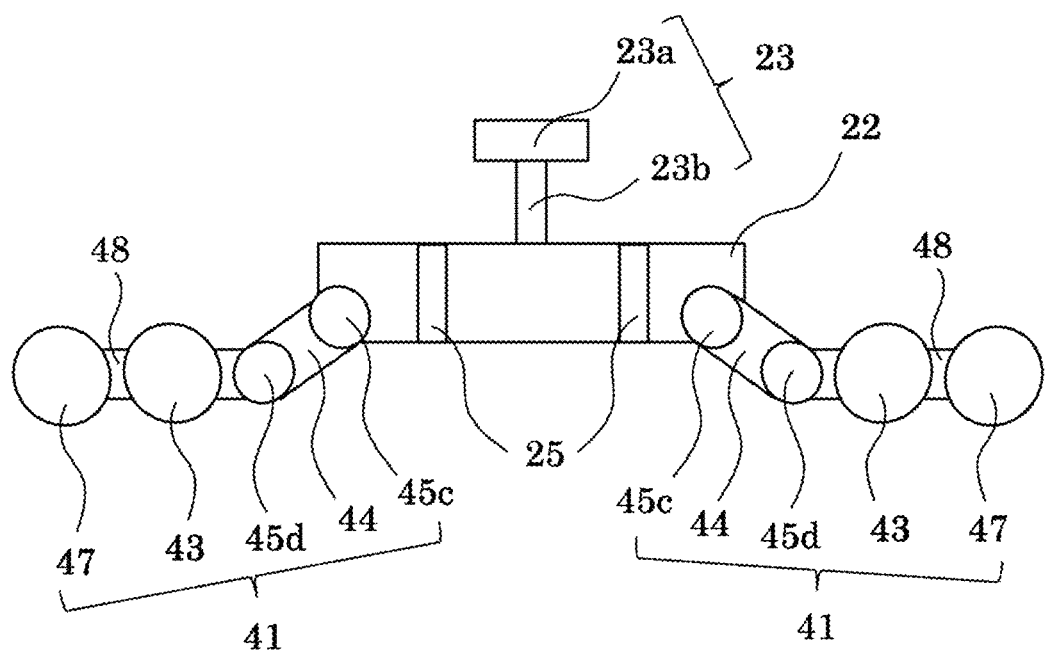
FIG. 15 is a schematic structure view of an inspection unit of a rotary electric machine examination device according to modification 4 of embodiment 1, as seen from the lateral direction.
Figure 16A:
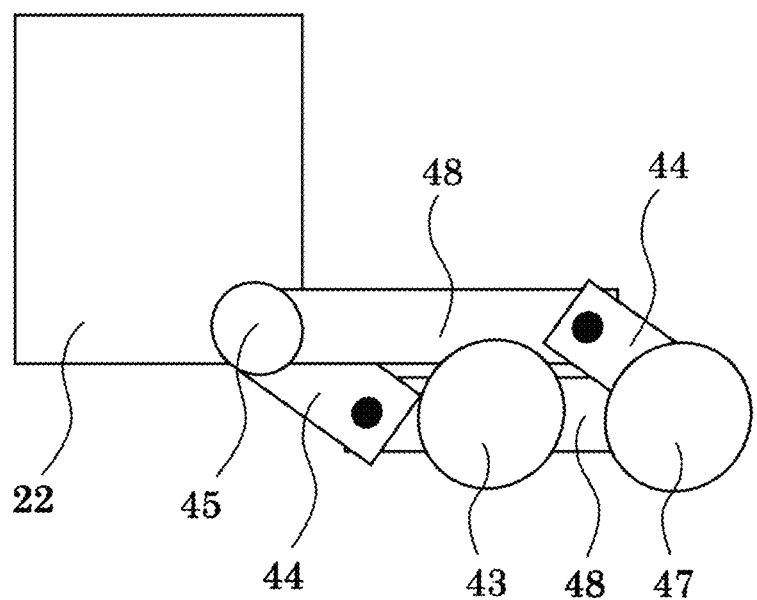
FIGS. 16A-16B are schematic structure views of an arm of the inspection unit of the rotary electric machine examination device according to modification 4 of embodiment 1, as seen from the lateral direction.
Figure 16B:
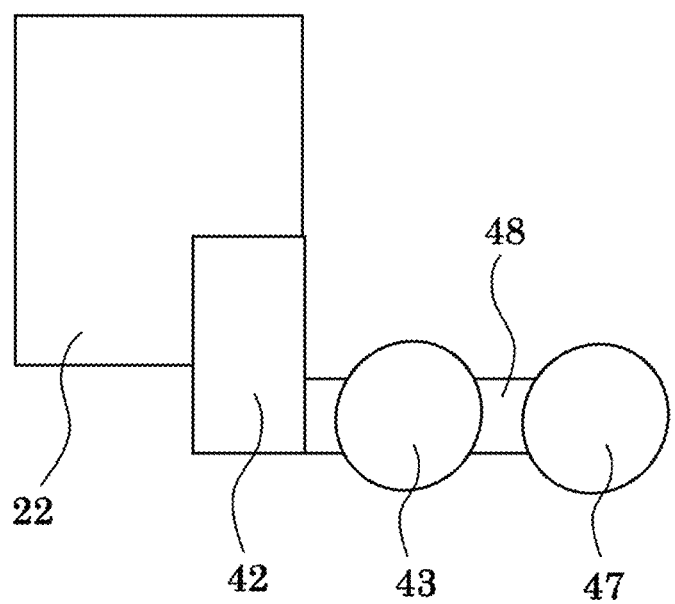

FIG. 15 is a schematic structure view of an inspection unit 21d of the rotary electric machine examination device 100 according to modification 4 of embodiment 1, as seen from the lateral direction. FIGS. 16A-16B are schematic structure views showing the shape of the arm 41 of the inspection unit 21d of the rotary electric machine examination device 100 according to modification 4 of embodiment 1, as seen from the lateral direction. In FIG. 15 and FIGS. 16A-16B, the following structure is different from that described above, but the other structures are the same as those of the rotary electric machine examination device 100 according to embodiment 1.

In FIG. 15, each arm 41 is composed of a first wheel 43, the fixed-length leg 44, a first angle adjustment jig 45c, a second wheel 47, a second angle adjustment jig 45d, and a horizontal leg 48. The first angle adjustment jig 45c and the second angle adjustment jig 45d are respectively provided at both ends of the fixed-length leg 44. The first wheel 43 and the second wheel 47 are attached to the horizontal leg 48 and are configured to contact with the stator 2 at the same time.

In the rotary electric machine examination device 100 according to modification 4 of embodiment 1, the number of contact parts on one side surface side, between the inspection unit 21d and the stator 2, is four. Therefore, in a case of performing inspection work for the rotary electric machine 1 in which grooves (not shown) are formed on the stator 2, the first wheel 43 or the second wheel 47 of the inspection unit 21d does not fall into the groove, and the first wheels 43 and the second wheels 47 can smoothly roll on the surface of the stator 2, thus providing an effect of significantly suppressing occurrence of vibration in the radial direction of the rotor 3 during movement of the inspection unit 21d.

Also provided is an effect that, even if the first wheel 43 or the second wheel 47 falls into the groove, a great driving force for the wheel to come out of the groove is not needed. In order to more assuredly realize such effects, the interval between the first wheel 43 and the second wheel 47 is adjusted in advance so as not to be the same as the interval between the grooves formed on the stator 2 of the rotary electric machine 1 that is an inspection target.

As a structure for providing the same effect as described above, the following structures may be adopted. For example, as shown in FIG. 16A, the arm 41 may have a four-bar-linkage structure using a plurality of fixed-length legs 44, horizontal legs 48, and the angle adjustment jig 45. Alternatively, as shown in FIG. 16B, the first wheel 43 and the second wheel 47 may be provided apart from each other with a certain interval via the horizontal leg 48 at the distal end of the adjusted-length leg 42.

Embodiment 2

Figure 17:
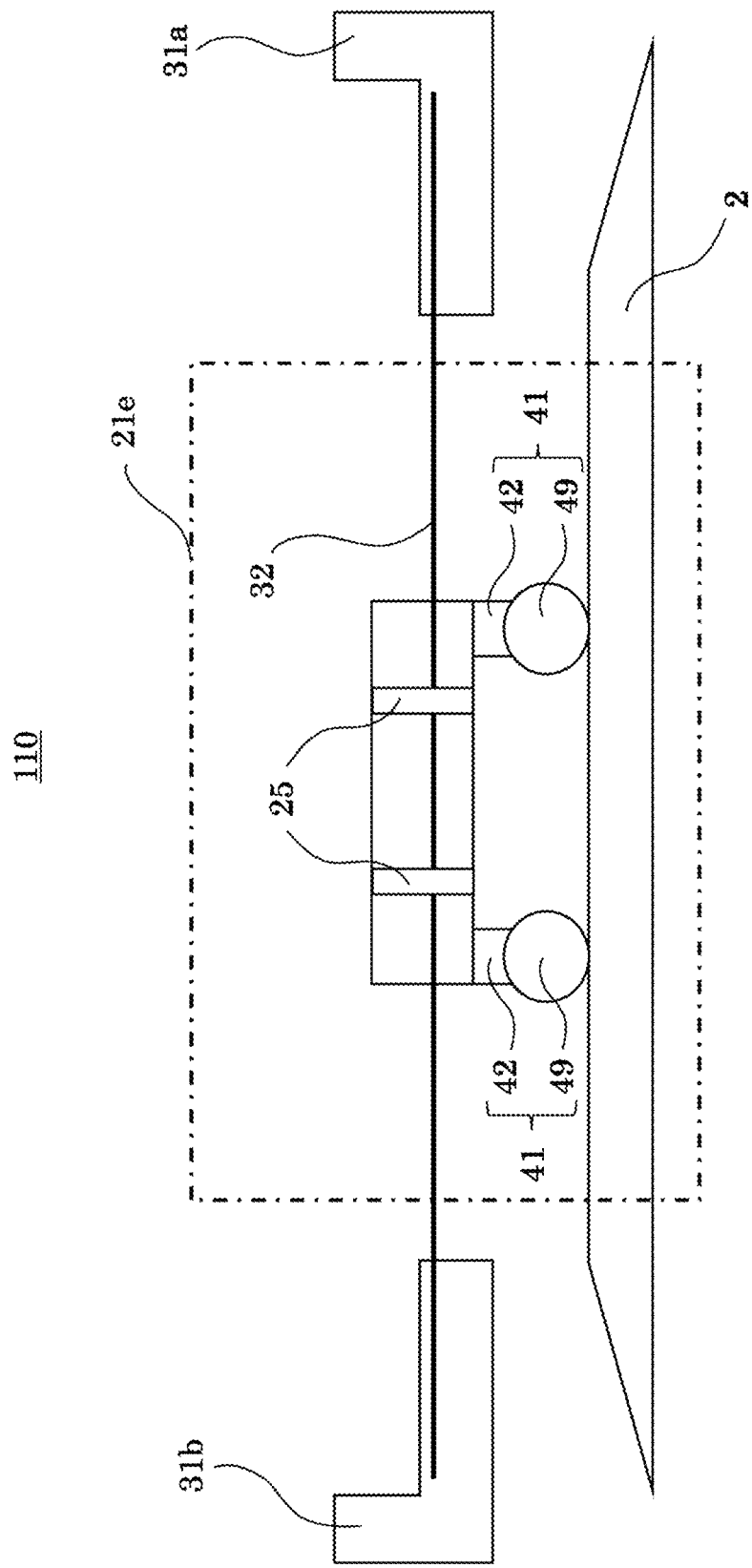
FIG. 17 is a schematic structure view of a guide wire, base units for stretching the guide wire, and an inspection unit in a rotary electric machine examination device according to embodiment 2, as seen from the lateral direction.

FIG. 17 is a schematic structure view of the first base unit 31a, the second base unit 31b, the guide wire 32 stretched between the first base unit 31a and the second base unit 31b, and an inspection unit 21e in a rotary electric machine examination device 110 according to embodiment 2, as seen from the lateral direction. Unless otherwise specified, the same reference characters as in embodiment 1 denote the same parts. In FIG. 17, the insertion rail 31c is not shown.

Hereinafter, differences from the rotary electric machine examination device 100 according to embodiment 1 will be mainly described. The other structures are the same as those in embodiment 1.

In the rotary electric machine examination device 110 according to embodiment 2, the guide wire 32 is stretched horizontally, i.e., in parallel to the surface of the stator 2 that is opposed to the bottom surface of the case 22 of the inspection unit 21e. Each arm 41 of the inspection unit 21e is composed of the adjusted-length leg 42 and a magnet wheel 49. The magnet wheel 49 is a wheel formed by a magnet. A magnetic attractive force to the stator 2 by the magnet wheels 49 is set to be greater than the self-weight of the inspection unit 21e, in advance. The guide wire 32 need not be stretched perfectly in parallel to the surface of the stator 2, and may deviate from a parallel state to a certain extent.

In the rotary electric machine examination device 110 according to embodiment 2, while the positions of the inspection unit 21e in the radial direction and the circumferential direction of the rotor 3 are precisely controlled by the magnet wheels 49 and the guide wire 32 stretched in parallel, the inspection unit 21e is moved on the stator 2 along the axial direction of the rotor 3, to perform inspection.

As described above, in the rotary electric machine examination device 110 according to embodiment 2, the self-weight of the inspection unit 21e is supported by the magnetic attractive force on the stator 2, whereby such trouble that the inspection unit 21e lifts off the stator 2 can be prevented, thus providing an effect of keeping constant the distance in the radial direction of the rotor 3 between the inspection unit 21e and the stator 2 or the rotor 3.

In addition, since the guide wire 32 can be provided horizontally, as compared to the rotary electric machine examination device 100 according to embodiment 1, contact between the guide 25 and the guide wire 32 can be suppressed, whereby wear of the guide wire 32 is suppressed, thus providing an effect of prolonging the life of the rotary electric machine examination device 110. A source for generating the attractive force of the inspection unit 21e to the stator 2 is not limited to a magnetic force, and another attraction means may be adopted.

The arms 41 are not limited to the structure shown in FIG. 17. For example, the structure in which the fixed-length leg 44 or the angle adjustment jig 45 is combined as shown in embodiment 1 may be adopted, or another structure may be adopted. In addition, the structure in embodiment 1 and the structure in embodiment 2 may be combined. For example, a structure in which a force for pressing the inspection unit 21e to the stator 2 is obtained by both the guide wire 32 and the magnet wheels 49, may be adopted.

Embodiment 3

Figure 18:
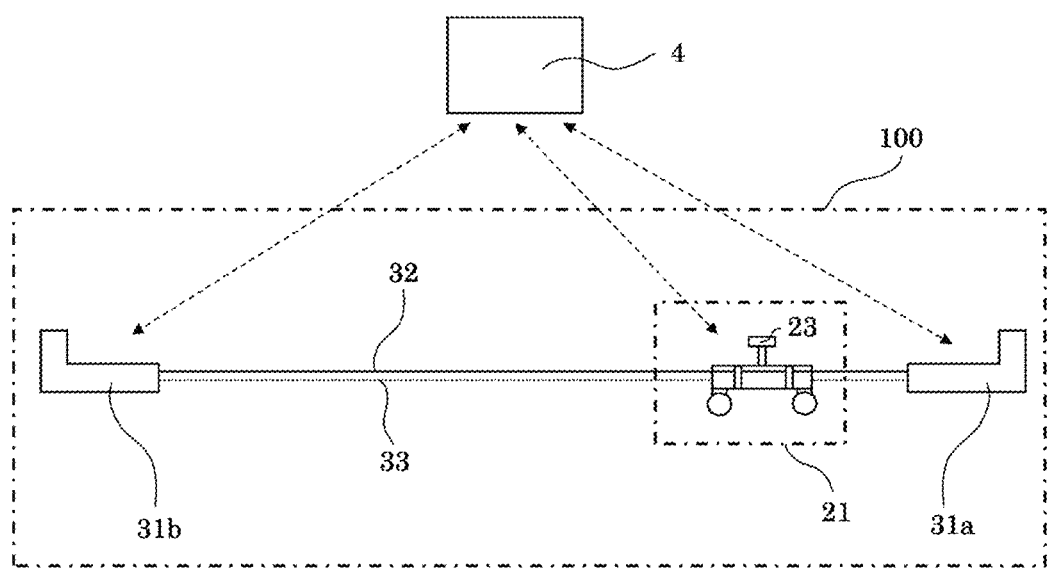
FIG. 18 is a schematic structure view showing the entire structure of a rotary electric machine examination system according to embodiment 3.
Figure 19:
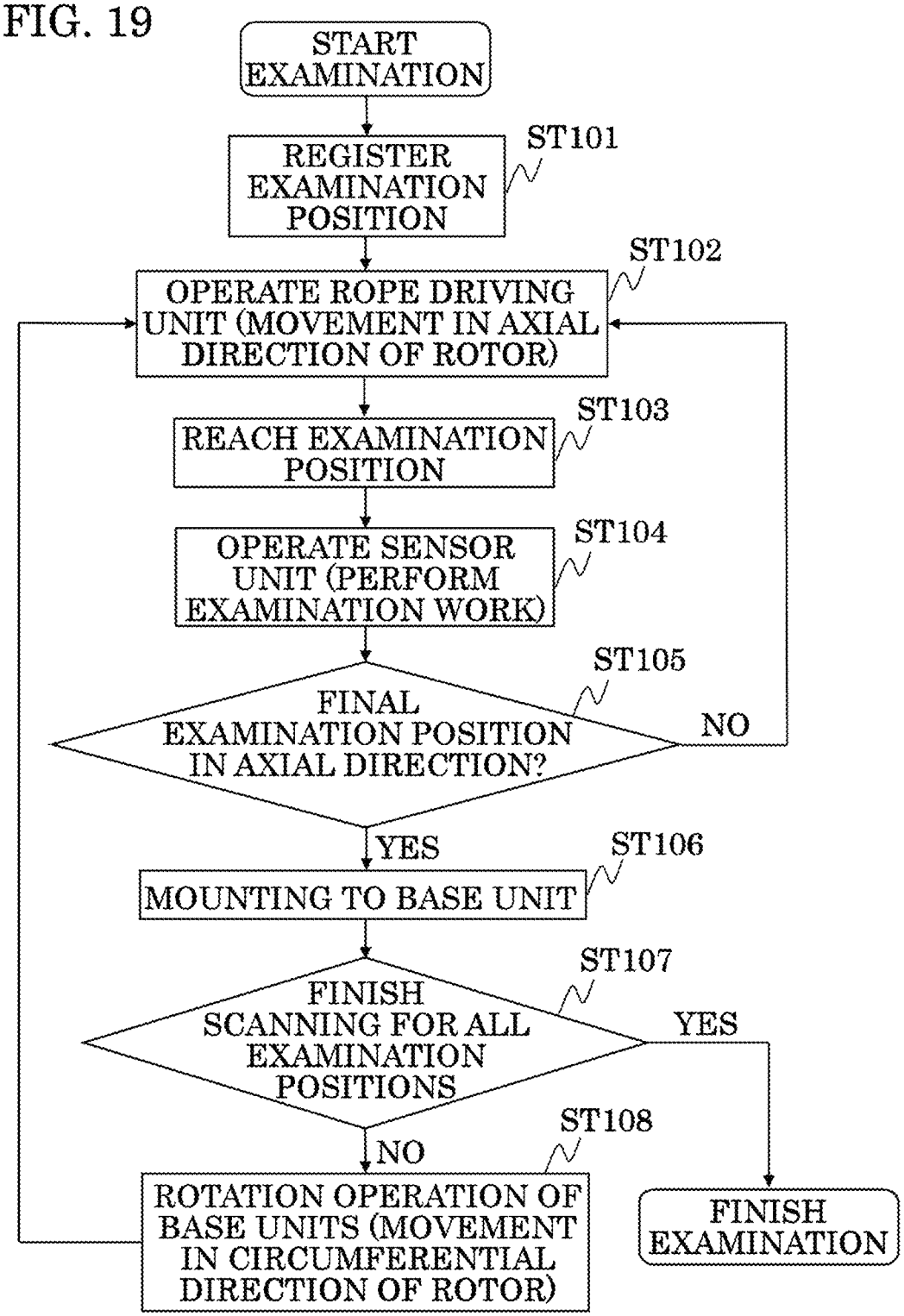
FIG. 19 is a flowchart showing an example of an examination method in the rotary electric machine examination system according to embodiment 3.

FIG. 18 is a schematic structure view showing the entire structure of a rotary electric machine examination system 200 according to embodiment 3. The rotary electric machine examination system 200 is composed of combination of the remote device 4 and either of the rotary electric machine examination devices 100 and 110 according to embodiments 1 and 2. FIG. 19 is a flowchart showing an example of an examination method in the rotary electric machine examination system 200 according to embodiment 3. Unless otherwise specified, the same reference characters as in embodiments 1 and 2 denote the same parts.

The sensor unit 23 mounted to the inspection unit 21, the rope driving unit 39a mounted to one or both of the first base unit 31a and the second base unit 31b, and a rotary drive source (not shown) such as an electric motor connected to at least one of the first guide wheel 34, the second guide wheel 35, or the guide roller 37, are connected with the remote device 4 through communication and are configured to be controllable. The remote device 4 has, therein, a control unit (not shown) for controlling the entirety of the rotary electric machine examination system 200 through communication.

In an initial state of the rotary electric machine examination system 200, the first base unit 31a and the second base unit 31b are respectively provided on both end sides of the rotor retaining rings 3b of the rotary electric machine 1, the guide wire 32 and the driving rope 33 are stretched inside the rotary electric machine 1, and the inspection unit 21 combined with the guide wire 32 and the driving rope 33 is placed closely to or stored in either the first base unit 31a or the second base unit 31b.

Hereinafter, the examination method in the rotary electric machine examination system 200 will be described with reference to the flowchart in FIG. 19.

First, before starting inspection work, examination position information inside the rotary electric machine 1 that is an examination target is registered in advance (ST101).

Next, the rope driving unit 39a is operated to move the inspection unit 21 along the axial direction of the rotor 3 to an examination position while movement in the circumferential direction and the radial direction is restricted by the guide wire 32 (ST102).

When the inspection unit 21 has reached the examination position, driving of the rope driving unit 39a is stopped to stop the inspection unit 21 (ST103).

At the position where the inspection unit 21 is stopped, the sensor unit 23 is operated to perform examination work (ST104). Specifically, in response to a control signal transmitted from the control unit (not shown) provided inside the remote device 4 located outside the rotary electric machine 1, a command is issued from the control unit (not shown) stored in the case 22 of the inspection unit 21, whereby the sensor elevating/lowering mechanism 23b extends toward the rotor shaft 3a side of the rotor 3, to bring the contact-type sensor 23a into contact with the rotor shaft 3a. Through contact between the contact-type sensor 23a and the rotor shaft 3a, the distance between the stator 2 and the rotor 3, and the like, are measured.

Whether or not the above position is a registered final examination position in the axial direction is determined (ST105).

If the above position is the registered final examination position in the axial direction, the inspection unit 21 is moved to the closer one of the first base unit 31a and the second base unit 31b, so as to be mounted thereto (ST106). In a case where the insertion rail 31c is mounted to only one of the base units 31, the inspection unit 21 is always stored into the base unit 31 to which the insertion rail 31c is mounted.

In a case where the above position is not the registered final examination position in the axial direction, the inspection unit 21 is moved to the next examination position by the rope driving unit 39a (ST102).

When the inspection unit 21 has been mounted to either the first base unit 31a or the second base unit 31b, whether or not scanning for all the examination positions inside the rotary electric machine 1 is finished is determined (ST107).

If scanning for all the examination positions inside the rotary electric machine 1 is finished, the examination flow is finished.

On the other hand, if scanning for all the examination positions inside the rotary electric machine 1 is not finished, each base unit 31 is moved in the circumferential direction of the rotor 3 by the rotary drive source (not shown) such as the electric motor connected to at least one of the first guide wheel 34, the second guide wheel 35, or the guide roller 37, to continue the examination flow (ST108).

With the rotary electric machine examination method using the rotary electric machine examination system 200 according to embodiment 3, in an examination process for one rotary electric machine, after the rotary electric machine examination device 100 is placed inside the rotary electric machine 1, inspection work in the rotary electric machine can be automatically performed with high accuracy, thus providing an effect that the rotary electric machine can be examined more efficiently.

The operation speeds of drive elements and the operation time required for inspection work by the sensor unit 23 during the examination flow in FIG. 19 are already known, thus providing an effect that the time required for examination of the entire rotary electric machine 1 can be predicted on the basis of the movement amount in the axial direction of the inspection unit 21 and the movement amount in the circumferential direction of each base unit 31 which are obtained from the examination position information inside the rotary electric machine 1.

Figure 20:
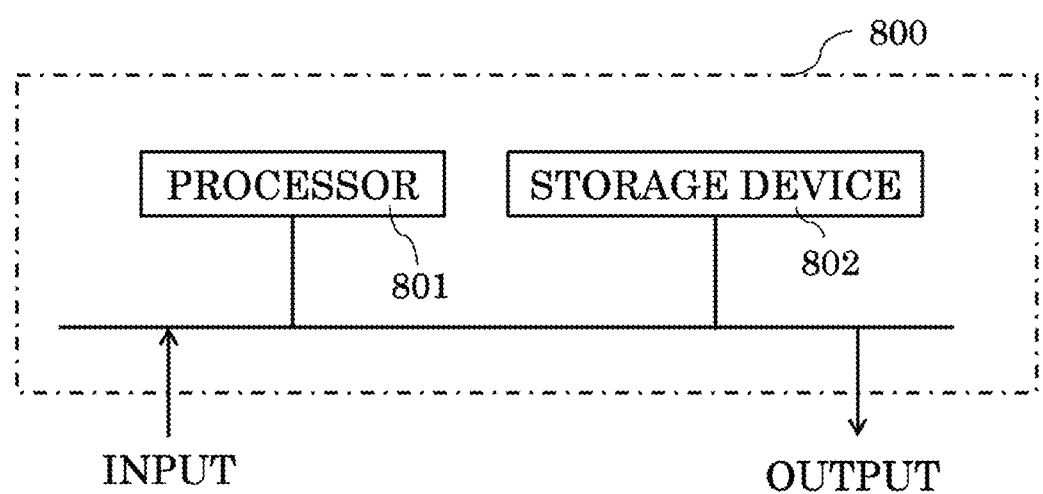
FIG. 20 shows an example of hardware of the rotary electric machine examination system according to embodiment 3.

In the structure of the rotary electric machine examination system 200 according to embodiment 3 described above, the control unit (not shown) is described as a function block. An example of the configuration of hardware storing the control unit is shown in FIG. 20. Hardware 800 is composed of a processor 801 and a storage device 802. The storage device 802 is provided with a volatile storage device such as a random access memory and a nonvolatile auxiliary storage device such as a flash memory (not shown).

Instead of the flash memory, an auxiliary storage device of a hard disk may be provided. The processor 801 executes a program inputted from the storage device 802. In this case, the program is inputted from the auxiliary storage device to the processor 801 via the volatile storage device. The processor 801 may output data such as a calculation result to the volatile storage device of the storage device 802, or may store such data into the auxiliary storage device via the volatile storage device.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS

1 rotary electric machine
2 stator
3 rotor
3a rotor shaft
3b rotor retaining ring
4 remote device
21, 21a, 21b, 21c, 21d, 21e inspection unit
22 case (housing)
23, 24 sensor unit
23a contact-type sensor
23b sensor elevating/lowering mechanism
25 guide
31 base unit
31a first base unit
31b second base unit
31c insertion rail
32 guide wire
33 driving rope
34 first guide wheel
35 second guide wheel
36 winding mechanism
37 guide roller
38a tension imparting unit
38b guide wire support shaft
38c first guide wire roller
38d second guide wire roller
39a rope driving unit
39b driving rope roller
40 station
40a base-unit-side elevating/lowering mechanism
41 arm
42 adjusted-length leg
43, 47 wheel
44 fixed-length leg
45, 45a, 45b angle adjustment jig
45c first angle adjustment jig
45d second angle adjustment jig
48 horizontal leg
49 magnet wheel
100, 110 rotary electric machine examination device
200 rotary electric machine examination system
800 hardware
801 processor
802 storage device

The invention claimed is:

1. A rotary electric machine examination device for examining a rotary electric machine having an annular stator and a rotor rotatably provided on an inner surface side of the stator, the rotary electric machine examination device comprising:
a first base unit and a second base unit respectively attached to one and another of rotor retaining rings respectively fixed to both end sides in an axial direction of the rotor;
a guide wire stretched between the first base unit and the second base unit;
an inspection unit including a housing of which both side surfaces are restricted by the guide wire, and a sensor unit which is attached to the housing and measures the rotor, the inspection unit being movable in the axial direction on the stator; and
a driving rope of which one end is attached to the housing and which drives the inspection unit along the axial direction, wherein
the guide wire is stretched such that a distance between the guide wire and a rotation axis of the rotor at positions of the first base unit and the second base unit is greater than a distance between the guide wire and the rotation axis of the rotor at a position of the inspection unit.

2. The rotary electric machine examination device according to claim 1, wherein
the guide wire is stretched such that, at the position of the first base unit or the second base unit, the guide wire is farthest from the rotation axis of the rotor, and at the position of the inspection unit, the guide wire is closest to the rotation axis of the rotor.

3. The rotary electric machine examination device according to claim 1, further comprising a tension imparting unit which is provided to one or both of the first base unit and the second base unit and to which one end of the guide wire is fixed, the tension imparting unit imparting tension to the guide wire.

4. The rotary electric machine examination device according to claim 3, wherein
the tension imparting unit is provided to one or both of the first base unit and the second base unit via a base-unit-side elevating/lowering mechanism for elevating/lowering in a radial direction of the rotor.

5. The rotary electric machine examination device according to claim 3, wherein
the guide wire is inserted through guides respectively provided at both side surfaces of the housing, and
a distance between a pair of the tension imparting unit and a guide wire support shaft provided to one or both of the first base unit and the second base unit is greater than a distance between the guides respectively provided at the both side surfaces.

6. The rotary electric machine examination device according to claim 3, wherein
the guide wire is inserted through guides respectively provided at both side surfaces of the housing, and
a distance between a pair of the tension imparting unit and a guide wire support shaft provided to one or both of the first base unit and the second base unit is smaller than a distance between the guides respectively provided at the both side surfaces.

7. The rotary electric machine examination device according to claim 1, wherein
the inspection unit includes an arm composed of a wheel and an adjusted-length leg of which one end and another end are respectively attached to the wheel and the housing and which is for adjusting a distance between the inspection unit and the rotor.

8. The rotary electric machine examination device according to claim 7, wherein
the wheel composing one said arm of the inspection unit comprises a plurality of wheels.

9. The rotary electric machine examination device according to claim 1, wherein
the inspection unit includes an arm composed of a wheel, a fixed-length leg of which one end and another end are respectively attached to the wheel and the housing, and an angle adjustment jig for adjusting an angle between the fixed-length leg and the housing.

10. The rotary electric machine examination device according to claim 9, wherein
the angle adjustment jig composing one said arm of the inspection unit comprises a plurality of angle adjustment jigs.

11. The rotary electric machine examination device according to claim 1, further comprising winding mechanisms for fixing the first base unit and the second base unit to the rotor retaining rings and moving the inspection unit in a circumferential direction of the rotor.

12. The rotary electric machine examination device according to claim 1, wherein
an insertion rail is attached to at least one of the first base unit and the second base unit.

13. A rotary electric machine examination system comprising:
the rotary electric machine examination device according to claim 1; and
a remote device connected with the rotary electric machine examination device through communication.

14. A rotary electric machine examination method using a rotary electric machine examination system including the rotary electric machine examination device according to claim 1 and a remote device connected with the rotary electric machine examination device through communication, the method comprising the steps of:
registering examination position information of the inspection unit inside the rotary electric machine;
performing movement in a circumferential direction of the rotor in a state in which the inspection unit is mounted to the first base unit or the second base unit, on the basis of the examination position information;
moving the inspection unit in the axial direction of the rotor by the driving rope on the basis of the examination position information; and
the inspection unit performing inspection at each examination position by at least one inspection means on the basis of the examination position information.

15. A rotary electric machine examination device for examining a rotary electric machine having an annular stator and a rotor rotatably provided on an inner surface side of the stator, the rotary electric machine examination device comprising:
a first base unit and a second base unit respectively attached to one and another of rotor retaining rings respectively fixed to both end sides in an axial direction of the rotor;
a guide wire stretched between the first base unit and the second base unit;
an inspection unit including a housing of which both side surfaces are restricted by the guide wire, arms which are attached to the both side surfaces of the housing and are each provided with, at one end, a magnet wheel for generating a magnetic attractive force to the stator, and a sensor unit which is attached to the housing and measures the rotor, the inspection unit being movable in the axial direction on the stator;
a driving rope of which one end is attached to the housing and which drives the inspection unit along the axial direction; and
an insertion rail attached to at least one of the first base unit and the second base unit.

* * * * *